US012593301B2

(12) United States Patent
Ying et al.

(10) Patent No.: US 12,593,301 B2
(45) Date of Patent: Mar. 31, 2026

(54) A1 ENRICHMENT INFORMATION FOR USER EQUIPMENT (UE) PHYSICAL POSITIONING INFORMATION

(71) Applicant: Intel Corporation, Santa Clara, CA (US)

(72) Inventors: Dawei Ying, Hillsboro, OR (US); Nicholas Whinnett, Bath (GB); Jan Schreck, San Jose, CA (US); Jaemin Han, Portland, OR (US); Leifeng Ruan, Beijing (CN); Qian Li, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 159 days.

(21) Appl. No.: 18/311,508

(22) Filed: May 3, 2023

(65) Prior Publication Data

US 2023/0319773 A1      Oct. 5, 2023

Related U.S. Application Data

(60) Provisional application No. 63/338,287, filed on May 4, 2022.

(51) Int. Cl.
*H04W 64/00*          (2009.01)
(52) U.S. Cl.
CPC ................................. *H04W 64/00* (2013.01)
(58) Field of Classification Search
CPC ... H04W 64/00; H04W 64/006; G01S 5/0018; G01S 5/0236

USPC ...................................................... 455/456.1
See application file for complete search history.

(56) References Cited

U.S. PATENT DOCUMENTS

| | | | | |
|---|---|---|---|---|
| 2022/0247634 A1* | 8/2022 | Wang | ...................... | H04W 4/50 |
| 2022/0295309 A1* | 9/2022 | Akhtar | .................. | H04W 24/02 |
| 2023/0126312 A1* | 4/2023 | Tsai | ........................ | H04L 67/60 |
| | | | | 709/217 |
| 2023/0284178 A1* | 9/2023 | Parker | ....................... | G01S 5/01 |
| | | | | 455/456.1 |
| 2024/0121753 A1* | 4/2024 | Bao | ..................... | H04W 64/006 |
| 2024/0214859 A1* | 6/2024 | Chen | ..................... | H04W 24/02 |
| 2025/0097825 A1* | 3/2025 | Chandrashekar | ..... | H04W 92/14 |

OTHER PUBLICATIONS

3GPP, "Technical Specification Group Services and System Aspects; Universal Geographical Area Description (GAD) (Release 17)," 3GPP TS 23.032 V17.2.0 (Dec. 2021), 38 pages.

(Continued)

*Primary Examiner* — Hirdepal Singh

(74) *Attorney, Agent, or Firm* — Schwegman Lundberg & Woessner, P.A.

(57)          ABSTRACT

Various embodiments herein provide techniques related to communication between a non real-time (Non-RT) radio access network (RAN) intelligent controller (RIC) and a near real-time (Near-RT) RIC. Specifically, the Non-RT RIC may identify physical positioning information related to a user equipment (UE); generate enrichment information (EI) related to the physical positioning information; and transmit the EI over an A1 interface to the Near-RT RIC. Other embodiments may be described and/or claimed.

20 Claims, 9 Drawing Sheets

(56)            References Cited

OTHER PUBLICATIONS

3GPP, "Technical Specification Group Core Network and Terminals; 5G System; Common Data Types for Service Based Interfaces; Stage 3 (Release 17)," 3GPP TS 29.571 V17.5.0 (Mar. 2022), 5G, 178 pages.

3GPP, "Technical Specification Group Core Network and Terminals; 5G System; Location Management Services; Stage 3 (Release 17)," 3GPP TS 29.572 V17.4.0 (Mar. 2022), 5G, 94 pages.

O-RAN, "O-RAN Working Group 2 (Non-RT RIC and A1 interface WG) A1 interface: Type Definitions," O-RAN.WG2.A1TD-v03.00, Apr. 1, 2022, O-RAN Alliance e.V., Alfter, Germany, 60 pages.

O-RAN, "O-RAN Working Group 2, A1 interface: General Aspects and Principles," O-RAN-WG2.A1GAP-v02.00, Jul. 30, 2020, O-RAN Alliance e.V., 24 pages.

O-RAN, "O-RAN Working Group 2 (Non-RT RIC and A1 interface WG) A1 interface: Application Protocol," O-RAN. WG2.A1AP-v03.02, Apr. 1, 2022, O-RAN Alliance e.V., Alfter, Germany, 56 pages.

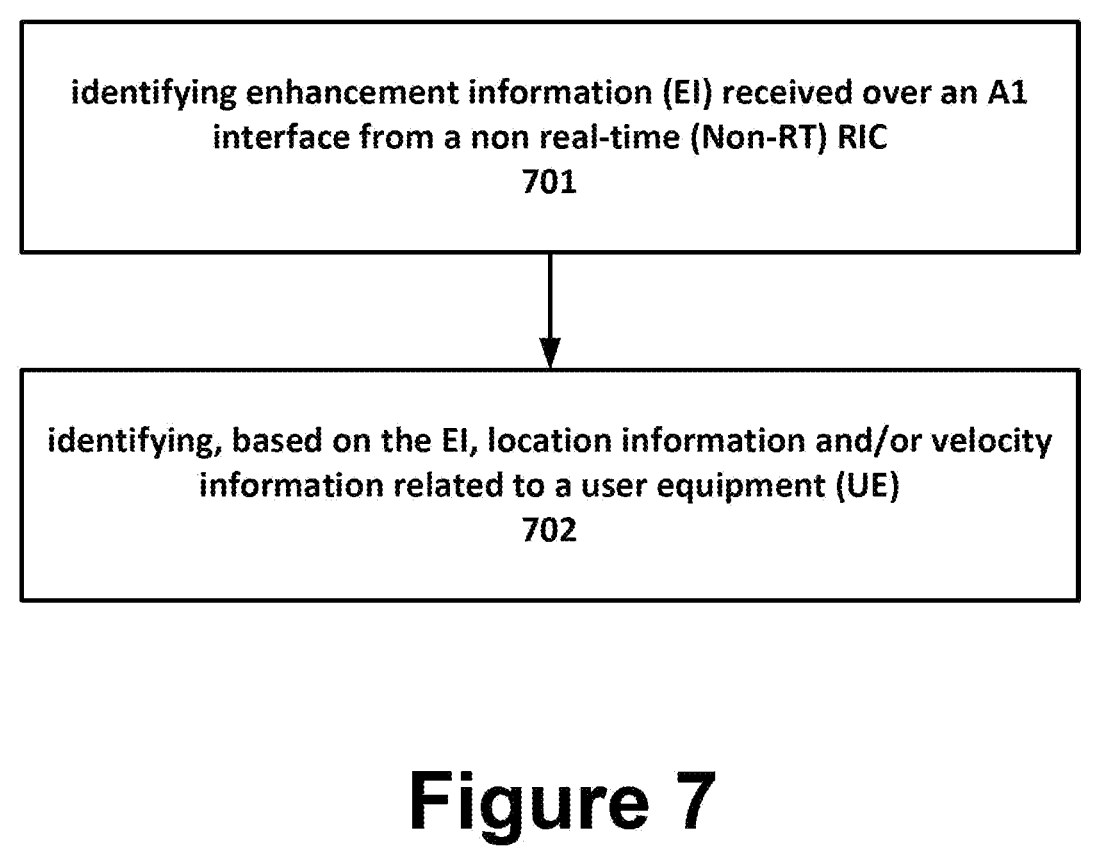

* cited by examiner identifying enhancement information (EI) received over an A1
interface from a non real-time (Non-RT) RIC
701 identifying, based on the EI, location information and/or velocity
information related to a user equipment (UE)
702

Figure 7

Identifying physical positioning information related to a UE
801

Generating EI related to the physical positioning information
802

Transmitting the EI over an A1 interface to a Near-RT RIC
803

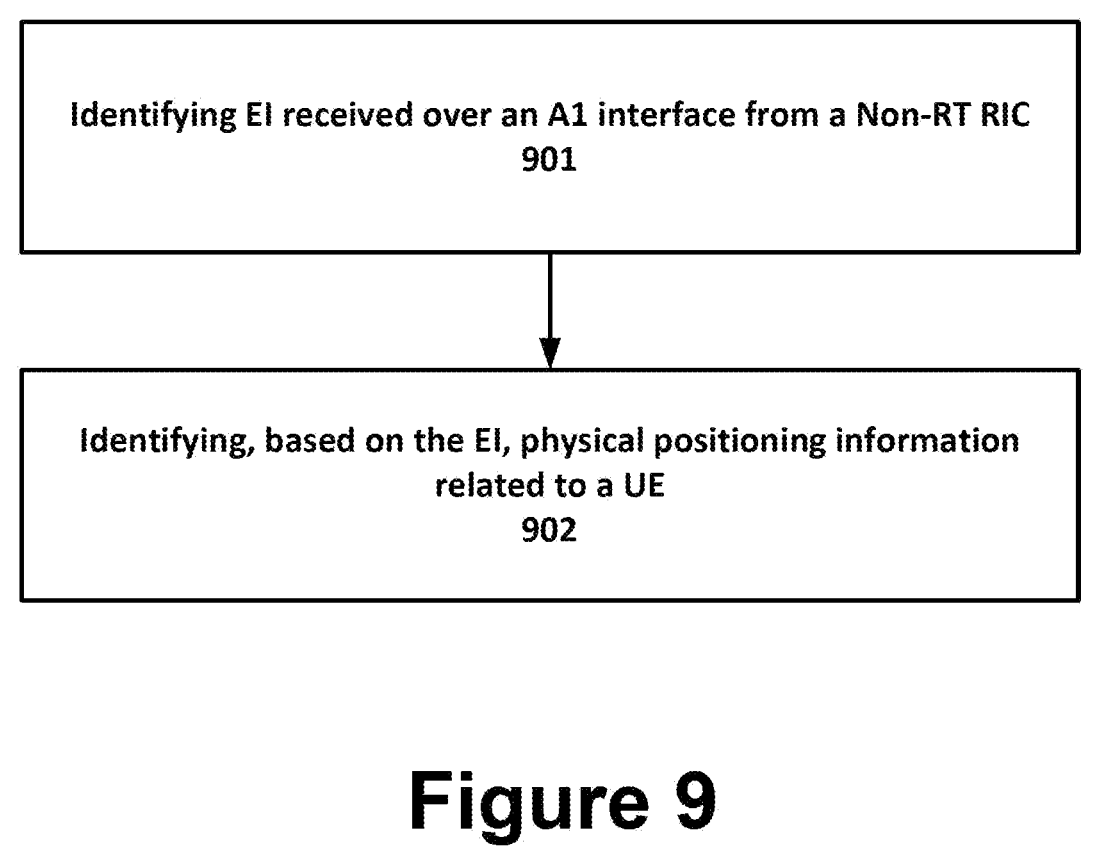

Identifying EI received over an A1 interface from a Non-RT RIC
901

Identifying, based on the EI, physical positioning information related to a UE
902

Figure 9

A1 ENRICHMENT INFORMATION FOR USER EQUIPMENT (UE) PHYSICAL POSITIONING INFORMATION

CROSS REFERENCE TO RELATED APPLICATION

The present application claims priority to U.S. Provisional Patent Application No. 63/338,287, which was filed May 4, 2022; the disclosure of which is hereby incorporated by reference.

FIELD

Various embodiments generally may relate to the field of wireless communications. For example, some embodiments may relate to user equipment (UE) physical positioning information.

BACKGROUND

Various embodiments generally may relate to the field of wireless communications.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 7 depicts another example procedure for practicing the various embodiments discussed herein.

FIG. 9 depicts another example procedure for practicing the various embodiments discussed herein.

DETAILED DESCRIPTION

Figure 1:
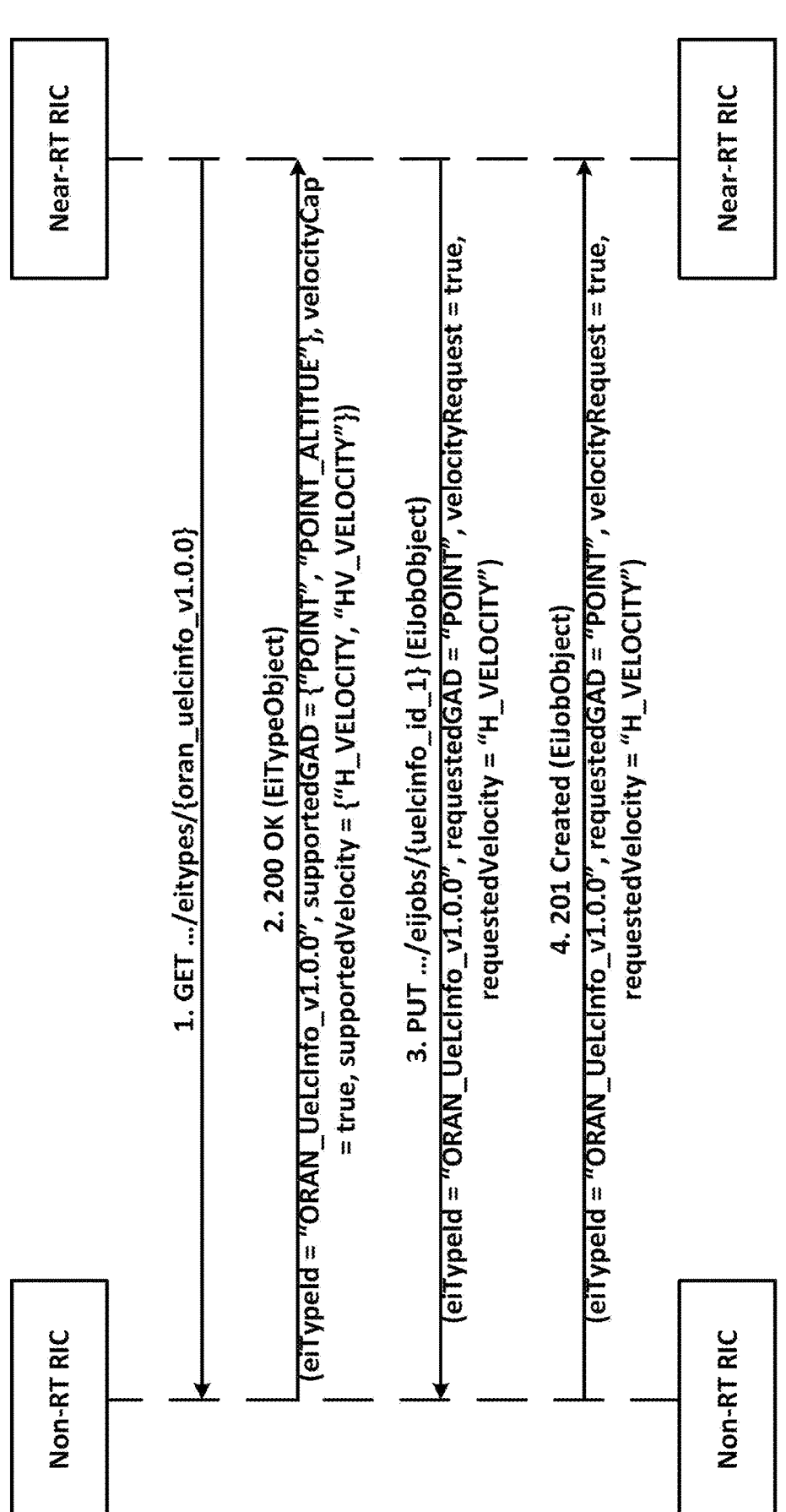
FIG. 1 schematically illustrates an example procedure related to UE physical positioning, in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Open radio access network (O-RAN) may relate to insertion of artificial intelligence (AI) and machine learning (ML) into wireless communication networks through use of a non real-time (Non-RT) and/or near real-time (Near-RT) radio access network (RAN) intelligent controller (RIC) [1]. An O-RAN specified interface, which may be referred to as the "A1 interface," was introduced between the Non-RT RIC and Near-RT RIC. Generally, the Non-RT RIC may provide policy-based guidance and enrichment information to a Near-RT RIC for intelligent RAN optimization and operation via this A1 interface.

Embodiments herein relate to a data model of UE positioning information that may be provided as A1 enrichment information. As used herein, UE positioning information may refer to location information and/or velocity information. However, it will be understood that, to the extent the specific types of information (e.g., location and/or velocity) is described herein, such description is for the purpose of discussion of an example embodiment. Other embodiments may use, include, or relate to additional and/or alternative types of positioning information such as acceleration information, turning information, altitude change information, etc.

Brief Overview on A1 Enrichment Information [2-4]

A1 enrichment information (EI) may refer to information that is generally not available to the Near-RT RIC. Rather, the A1 EI may be provided from the Non-RT RIC to the Near-RT RIC via the A1 interface to enhance the performance of RAN optimization and operation in Near-RT RIC. Generally, the A1 interface may be used for discovery, request, and delivery of A1 EI.

The Non-RT RIC may support different types of A1 EI, which may be referred to as "EI types," and the Near-RT RIC may use A1-EI services to discover available EI types in the Non-RT RIC. The Non-RT RIC may be responsible for ensuring that EI types discovered by the Near-RT RIC can be used to create EI Jobs. EI job results may be delivered over the A1 interface. An "EI job" may refer to a resource created for the delivery of enrichment information, or so-called EI job results. An EI job may be created, modified, and deleted by the Near-RT RIC. The EI job results may be delivered from the Non-RT RIC to the Near-RT RIC using a push-based delivery method, and the Non-RT RIC may be responsible to set-up connection with Near-RT RIC to delivery EI job results.

UE Location and Velocity Information

The UE location and velocity information may have various formats. The third generation partnership project (3GPP) technical specification (TS) 23.032 [5] defines the concept of a universal Geographical Area Description (GAD), and provides description of velocity that can be associated with a universal GAD.

To describe UE position, different types of GAD shapes may be used, e.g.,

Ellipsoid point

Ellipsoid point with uncertainty circle

Ellipsoid point with uncertainty ellipse

Polygon

Ellipsoid point with altitude

Ellipsoid point with altitude and uncertainty ellipsoid

Ellipsoid arc, etc.

UE velocity may be described with various alternatives, e.g.,

Horizontal Velocity

Horizontal and Vertical Velocity

Horizontal Velocity with Uncertainty

Horizontal and Vertical Velocity with Uncertainty, etc.

A1 EI for UE Location and Velocity Information

The A1 EI for UE location and velocity information provide UE positions (latitudes, longitudes, and altitudes) and UE velocity with time stamps.

In one embodiment, a single EI Type may be defined, for example, EiTypeId= "ORAN_UeLcInfo_1.0.0", to support various formats of UE location and velocity information.

The Non-RT RIC may provide this EI Type list all supported formats in the EI type specific information in the EITypeObject. In one embodiment, the following attributes may be defined under EITypeObject of A1 EI for UE location and velocity information

TABLE 6-1

Definition of type UeLcInfoCap in EITypeObject

| Attribute name | Data type | P | Cardinality | Description |
|---|---|---|---|---|
| supported-GAD | array (SupportedGAD) | M | 1...N | This information element (IE) indicates the supported GAD shapes in the Non-RT RIC. The enumeration values are defined in Table 6-2 |
| velocityCap | Boolean | M | 1 | This IE indicates whether the Non-RT RIC can provide UE velocity information true: A1 EI can include UE velocity information false: A1 EI cannot provide UE velocity information |
| supported-Velocity | array (SupportedVelocity) | C | 0...N | This IE indicates the supported velocity information formats in the Non-RT RIC. The enumeration values are defined in Table 6-3 |

NOTE: "supportedVelocity" shall be present if velocityCap is set as "true".

Note that "supportedGAD" attribute can also be optional with an additional attribute "gadCap" (Type Boolean).

TABLE 6-2

Enumeration SupportedGAD

| Enumeration Value | Description |
|---|---|
| "POINT" | Ellipsoid point |
| "POINT_UNCERTAINTY_CIRCLE" | Ellipsoid point with uncertainty circle |
| "POINT_UNCERTAINTY_ELLIPSE" | Ellipsoid point with uncertainty ellipse |
| "POLYGON" | Polygon |
| "POINT_ALTITUDE" | Ellipsoid point with altitude |
| "POINT_ALTITUDE_UNCERTAINTY" | Ellipsoid point with altitude and uncertainty ellipsoid |
| "ELLIPSOID_ARC" | Ellipsoid arc |

TABLE 6-3

Enumeration SupportedVelocity

| Enumeration Value | Description |
|---|---|
| "H_VELOCITY" | Horizontal Velocity |
| "HV_VELOCITY" | Horizontal and Vertical Velocity |
| "H_VELOCITY_UNCERTAINTY" | Horizontal Velocity with Uncertainty |
| "HV_VELOCITY_UNCERTAINTY" | Horizontal and Vertical Velocity with Uncertainty |

The Near-RT RIC request this EI Type uses the JobDefinition attribute in the EIJobObject to specify the location and velocity format it requires. In one embodiment, the following attributes are defined in the JobDefinition of A1 EI for UE location and velocity information.

TABLE 6-4

Definition of type UeLcInfoReq in EIJobObject

| Attribute name | Data type | P | Cardinality | Description |
|---|---|---|---|---|
| requested-GAD | Supported-GAD | M | 1 | This IE indicates the requested GAD shapes by the Near-RT RIC. The enumeration values are defined in Table 6-2 |
| velocity-Request | Boolean | O | 0...1 | This IE indicates whether the Near-RT RIC needs UE velocity information true: A1 EI should include UE velocity information false: UE velocity information is not required |
| requested-Velocity | Supported-Velocity | C | 0...1 | This IE indicates the requested velocity information formats by the Near-RT RIC. The enumeration values are defined in Table 6-3 |

NOTE: "requstedVelocity" shall be present if velocityRequest is presented and set as "true".

FIG. 1 demonstrates an example procedure of a Near-RT RIC querying the EI Type and creating an EI Job for UE location and velocity A1 EI. In the example, the Non-RT RIC supports 2 GAD shapes and can provide UE velocity information. The Near-RT RIC requests the "point" shape plus "horizontal velocity" for this A1 EI in the JobDefinition.

In one embodiment, one EI Type is defined for UE location information, and another EI type is defined for UE velocity information. If the Near-RT RIC needs both UE location and velocity information, it may request both EI types.

The EI job result object, in one embodiment, may be defined as follows.

TABLE 6-5

Definition of UE location and velocity A1 EI

| Attribute name | Data type | P | Cardinality | Description |
|---|---|---|---|---|
| UeId | String | M | 1 | This IE indicate the UE identifier, defined in Clause 4.2.1 in O-RAN.WG2.A1TD [4] |
| timeStamp | DateTime | M | 1 | This IE indicates the UTC time when the location (and velocity, if presented) information is recorded. Data type DateTime is defined in 3GPP TS 29.571[6] |
| location | Location | M | 1 | This IE indicates the UE location information. |
| velocity | Velocity | C | 0. . .1 | This IE indicates the UE velocity information. |

NOTE: "velocity" shall be present if Non-RT RIC support velocity information in EI (i.e., velocityCap=true) and Near-RT RIC requested velocity information (i.e., velocityRequest=true).

Based on Near-RT RIC's selection, the Location data type may be one of the data types from the following list of example data types (although, in other embodiments, some other type of data type may be used):

Type Point, defined in clause 6.1.6.2.6 in 3GPP TS 29.572 [7], if requestedGAD= "POINT"

Type PointUncertaintyCircle, defined in clause 6.1.6.2.7 in 3GPP TS 29.572 [7], if requestedGAD= "POINT_UNCERTAINTY_CIRCLE"

Type PointUncertaintyEllipse, defined in clause 6.1.6.2.8 in 3GPP TS 29.572 [7], if requestedGAD= "POINT_UNCERTAINTY_ELLIPSE"

Type Polygon, defined in clause 6.1.6.2.9 in 3GPP TS 29.572 [7], if requestedGAD= "POLYGON"

Type PointAltitude, defined in clause 6.1.6.2.10 in 3GPP TS 29.572 [7], if requestedGAD= "POINT_ALTITUDE"

Type PointAltitudeUncertainty, defined in clause 6.1.6.2.11 in 3GPP TS 29.572 [7], if requestedGAD= "POINT_ALTITUDE UNCERTAINTY"

Type EllipsoidArc, defined in clause 6.1.6.2.12 in 3GPP TS 29.572 [7], if requestedGAD= "ELLIPSOID ARC"

Based on Near-RT RIC's selection, the Velocity data type may be one of the data types from the following list of example data types (although, in other embodiments, a different type of data type may be used):

Type HorizontalVelocity, defined in clause 6.1.6.2.18 in 3GPP TS 29.572 [7], if requested Velocity= "H_VELOCITY"

Type HorizontalWith VerticalVelocity, defined in clause 6.1.6.2.19 in 3GPP TS 29.572 [7], if requested Velocity= "HV_VELOCITY"

Type HorizontalVelocityWithUncertainty, defined in clause 6.1.6.2.20 in 3GPP TS 29.572 [7], if requested Velocity= "H_VELOCITY_UNCERTAINTY"

Type HorizontalWith VerticalVelocityAndUncertainty, defined in clause 6.1.6.2.21 in 3GPP TS 29.572 [7], if requested Velocity= "HV_VELOCITY_UNCERTAINTY"

The EI job result object, in one embodiment, may be defined to contain UE location and velocity information for a group of UEs.

TABLE 6-6

Alternative definition of UE location and velocity A1 EI

| Attribute name | Data type | P | Cardinality | Description |
|---|---|---|---|---|
| UeIdList | array (String) | M | 1. . .N | This IE indicate a group of UEs. The UE identifier is defined in Clause 4.2.1 in O-RAN.WG2.A1TD [4] |
| timeStamp | DateTime | M | 1 | This IE indicates the UTC time when the location (and velocity, if presented) information is recorded. Data type DateTime is defined in 3GPP TS 29.571[6] |
| locationList | array (Location) | M | 1. . .N | This IE indicates the UE location information for each UE in the group. |
| velocityList | array (Velocity) | C | 0. . .N | This IE indicates the UE velocity information for each UE in the group. |

The EI job result object, in yet another embodiment, is defined to contain UE location and velocity information for a UE at multiple time instances.

TABLE 6-7

Alternative definition of UE location and velocity A1 EI

| Attribute name | Data type | P | Cardinality | Description |
|---|---|---|---|---|
| UeId | String | M | 1 | This IE indicate the UE identifier, which is defined in Clause 4.2.1 in O-RAN.WG2.A1TD [4] |
| timeStampList | array (DateTime) | M | 1. . .N | This IE indicates a series of UTC time instances, at which the location (and velocity, if presented) information is recorded. Data type DateTime is defined in 3GPP TS 29.571[6] |
| locationList | array (Location) | M | 1. . .N | This IE indicates the UE location information for each time instance. |
| velocityList | array (Velocity) | C | 0. . .N | This IE indicates the UE velocity information for each time instance. |

In another embodiment, multiple EI Types are defined and one EI Type may correspond to only a single format of UE location and velocity information. For example, in one embodiment up to 35 different EI types may be defined for various combinations of GAD shapes and velocity alternatives, in total, as shown in Table 6-8.

TABLE 6-8

| EiTypeId | Description |
| --- | --- |
| List of EiTypeIds for all possible combinations | |
| ORAN_GadPt_1.0.0 | This EI type provides "point" shape for UE position and no UE velocity information |
| ORAN_GadPtHVel_1.0.0 | This EI type provides "point" shape for UE position and UE horizonal velocity |
| ORAN_GadPtHVelUnc_1.0.0 | This EI type provides "point" shape for UE position and UE horizonal velocity with uncertainty |
| ORAN_GadPtHVVel_1.0.0 | This EI type provides "point" shape for UE position and UE horizonal and vertical velocity |
| ORAN_GadPtHVVelUnc_1.0.0 | This EI type provides "point" shape for UE position and UE horizonal and vertical velocity with uncertainty |
| ORAN_GadPtUncCir_1.0.0 | This EI type provides "point with uncertainty circle" shape for UE position and no UE velocity information |
| ORAN_GadPtUncCirHVel_1.0.0 | This EI type provides "point with uncertainty circle" shape for UE position and UE horizonal velocity |
| ORAN_GadPtUncCirHVelUnc_1.0.0 | This EI type provides "point with uncertainty circle" shape for UE position and UE horizonal velocity with uncertainty |
| ORAN_GadPtUncCirHVVel_1.0.0 | This EI type provides "point with uncertainty circle" shape for UE position and UE horizonal and vertical velocity |
| ORAN_GadPtUncCirHVVelUnc_1.0.0 | This EI type provides "point with uncertainty circle" shape for UE position and UE horizonal and vertical velocity with uncertainty |
| ORAN_GadPtUncElps_1.0.0 | This EI type provides "point with uncertainty ellipse" shape for UE position and no UE velocity information |
| ORAN_GadPtUncElpsHVel_1.0.0 | This EI type provides "point with uncertainty ellipse" shape for UE position and UE horizonal velocity |
| ORAN_GadPtUncElpsHVelUnc_1.0.0 | This EI type provides "point with uncertainty ellipse" shape for UE position and UE horizonal velocity with uncertainty |
| ORAN_GadPtUncElpsHVVel_1.0.0 | This EI type provides "point with uncertainty ellipse" shape for UE position and UE horizonal and vertical velocity |
| ORAN_GadPtUncElpsHVVelUnc_1.0.0 | This EI type provides "point with uncertainty ellipse" shape for UE position and UE horizonal and vertical velocity with uncertainty |
| ORAN_GadPoly_1.0.0 | This EI type provides "polygon" shape for UE position and no UE velocity information |
| ORAN_GadPolyHVel_1.0.0 | This EI type provides "polygon" shape for UE position and UE horizonal velocity |
| ORAN_GadPolyHVelUnc_1.0.0 | This EI type provides "polygon" shape for UE position and UE horizonal velocity with uncertainty |
| ORAN_GadPolyHVVel_1.0.0 | This EI type provides "polygon" shape for UE position and UE horizonal and vertical velocity |
| ORAN_GadPolyHVVelUnc_1.0.0 | This EI type provides "polygon" shape for UE position and UE horizonal and vertical velocity with uncertainty |
| ORAN_GadPtAlt_1.0.0 | This EI type provides "point with altitude" shape for UE position and no UE velocity information |
| ORAN_GadPtAltHVel_1.0.0 | This EI type provides "point with altitude" shape for UE position and UE horizonal velocity |
| ORAN_GadPtAltHVelUnc_1.0.0 | This EI type provides "point with altitude" shape for UE position and UE horizonal velocity with uncertainty |
| ORAN_GadPtAltHVVel_1.0.0 | This EI type provides "point with altitude" shape for UE position and UE horizonal and vertical velocity |
| ORAN_GadPtAltHVVelUnc_1.0.0 | This EI type provides "point with altitude" shape for UE position and UE horizonal and vertical velocity with uncertainty |
| ORAN_GadPtAltUnc_1.0.0 | This EI type provides "point with altitude and uncertainty ellipsoid" shape for UE position and no UE velocity information |

TABLE 6-8-continued

| EiTypeId | Description |
| --- | --- |
| List of EiTypeIds for all possible combinations | |
| ORAN_GadPtAltUncHVel_1.0.0 | This EI type provides "point with altitude and uncertainty ellipsoid" shape for UE position and UE horizonal velocity |
| ORAN_GadPtAltUncHVelUnc_1.0.0 | This EI type provides "point with altitude and uncertainty ellipsoid" shape for UE position and UE horizonal velocity with uncertainty |
| ORAN_GadPtAltUncHVVel_1.0.0 | This EI type provides "point with altitude and uncertainty ellipsoid" shape for UE position and UE horizontal and vertical velocity |
| ORAN_GadPtAltUncHVVelUnc_1.0.0 | This EI type provides "point with altitude and uncertainty ellipsoid" shape for UE position and UE horizontal and vertical velocity with uncertainty |
| ORAN_GadArc_1.0.0 | This EI type provides "ellipsoid arc" shape for UE position and no UE velocity information |
| ORAN_GadArcHVel_1.0.0 | This EI type provides "ellipsoid arc" shape for UE position and UE horizonal velocity |
| ORAN_GadArcHVelUnc_1.0.0 | This EI type provides "ellipsoid arc" shape for UE position and UE horizonal velocity with uncertainty |
| ORAN_GadArcHVVel_1.0.0 | This EI type provides "ellipsoid arc" shape for UE position and UE horizonal and vertical velocity |
| ORAN_GadArcHVVelUnc_1.0.0 | This EI type provides "ellipsoid arc" shape for UE position and UE horizonal and vertical velocity with uncertainty |

In this embodiment, the Non-RT RIC may not need to signal its capability in the EITypeObject, and the Near-RT RIC may not need to specify the request data format in the JobDefinition of EIJobObject. The definition of EI Job result may be the same, or similar to, that of Table 6-5. The data types of Location and Velocity may be based on EI type.

For example, Location may be Type Point and Velocity is Type HorizontalVelocity for EiTypeId= "ORAN_GadPtHVel 1.0.0"

REFERENCES

[1] O-RAN WG1, "O-RAN Architecture Description"
[2] O-RAN.WG2.A1GAP-v02.00
[3] O-RAN.WG2.A1AP-v03.02
[4] O-RAN.WG2.A1TD-v03.00
[5] 3GPP TS 23.032, "Universal Geographical Area Description (GAD)"
[6] 3GPP TS 29.571, "5G System; Common Data Types for Service Based Interfaces; Stage 3"
[7] 3" 3GPP TS 29.572, "5G System; Location Management Services; Stage 3"

Systems and Implementations

FIGS. 2-5 illustrate various systems, devices, and components that may implement aspects of disclosed embodiments.

Figure 2:
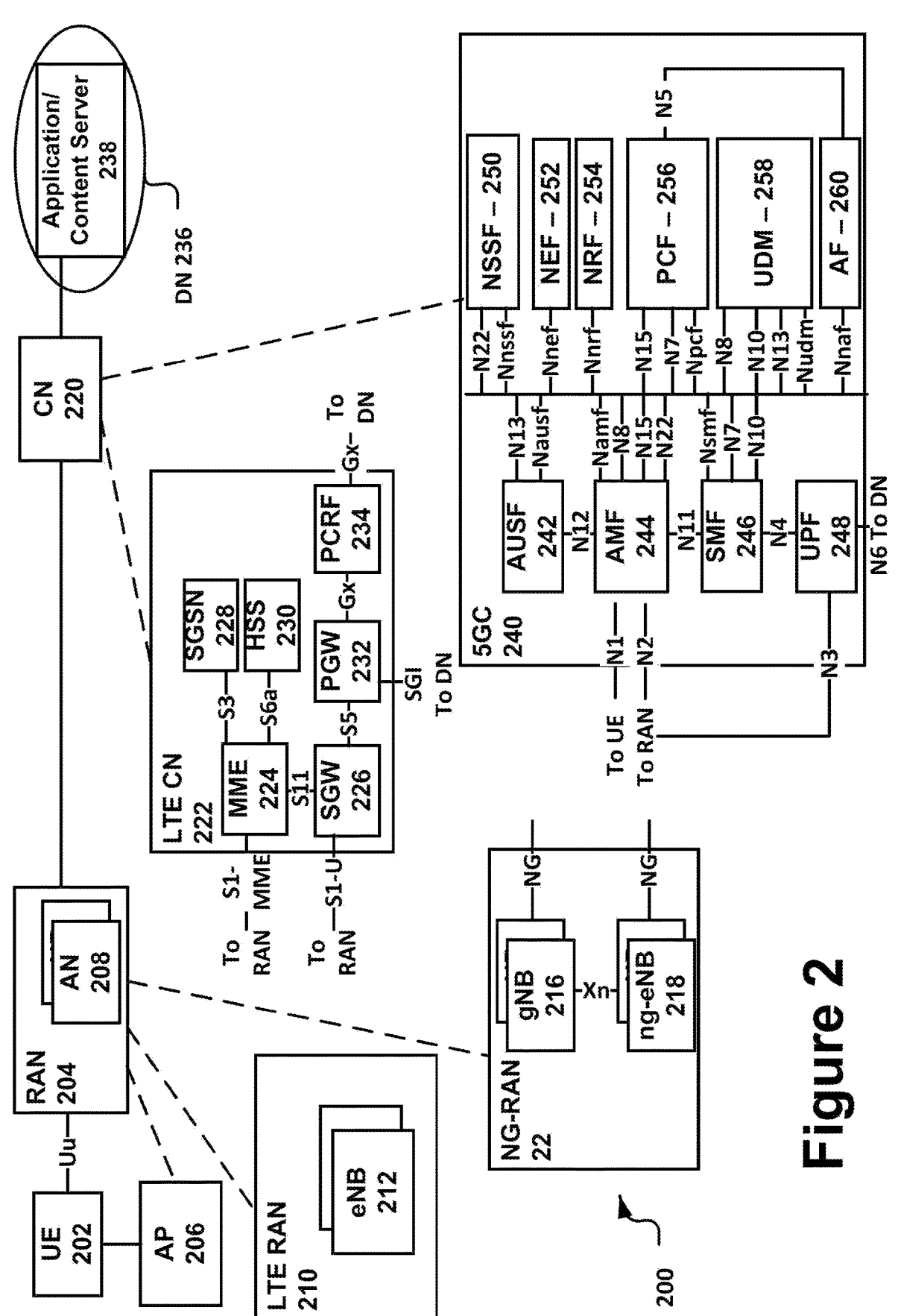
FIG. 2 schematically illustrates an example wireless network in accordance with various embodiments.

FIG. 2 illustrates a network 200 in accordance with various embodiments. The network 200 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 200 may include a UE 202, which may include any mobile or non-mobile computing device designed to communicate with a RAN 204 via an over-the-air connection. The UE 202 may be communicatively coupled with the RAN 204 by a Uu interface. The UE 202 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 200 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 202 may additionally communicate with an AP 206 via an over-the-air connection. The AP 206 may manage a WLAN connection, which may serve to offload some/all network traffic from the RAN 204. The connection between the UE 202 and the AP 206 may be consistent with any IEEE 802.11 protocol, wherein the AP 206 could be a wireless fidelity (Wi-Fi®) router. In some embodiments, the UE 202, RAN 204, and AP 206 may utilize cellular-WLAN aggregation (for example, LWA/LWIP). Cellular-WLAN aggregation may involve the UE 202 being configured by the RAN 204 to utilize both cellular radio resources and WLAN resources.

The RAN 204 may include one or more access nodes, for example, AN 208. AN 208 may terminate air-interface protocols for the UE 202 by providing access stratum protocols including RRC, PDCP, RLC, MAC, and L1 protocols. In this manner, the AN 208 may enable data/voice connectivity between CN 220 and the UE 202. In some embodiments, the AN 208 may be implemented in a discrete device or as one or more software entities running on server computers as part of, for example, a virtual network, which may be referred to as a CRAN or virtual baseband unit pool. The AN 208 be referred to as a BS, gNB, RAN node, eNB, ng-eNB, NodeB, RSU, TRxP, TRP, etc. The AN 208 may be a macrocell base station or a low power base station for providing femtocells, picocells or other like cells having smaller coverage areas, smaller user capacity, or higher bandwidth compared to macrocells.

In embodiments in which the RAN 204 includes a plurality of ANs, they may be coupled with one another via an X2 interface (if the RAN 204 is an LTE RAN) or an Xn interface (if the RAN 204 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 204 may each manage one or more cells, cell groups, component carriers, etc. to provide the UE 202 with an air interface for network access. The UE 202 may be simultaneously connected with a plurality of cells provided by the same or different ANs of the RAN 204. For example, the UE 202 and RAN 204 may use carrier aggregation to allow the UE 202 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 204 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 202 or AN 208 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 204 may be an LTE RAN 210 with eNBs, for example, eNB 212. The LTE RAN 210 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 204 may be an NG-RAN 214 with gNBs, for example, gNB 216, or ng-eNBs, for example, ng-eNB 218. The gNB 216 may connect with 5G-enabled UEs using a 5G NR interface. The gNB 216 may connect with a 5G core through an NG interface, which may include an N2 interface or an N3 interface. The ng-eNB 218 may also connect with the 5G core through an NG interface, but may connect with a UE via an LTE air interface. The gNB 216 and the ng-eNB 218 may connect with each other over an Xn interface.

In some embodiments, the NG interface may be split into two parts, an NG user plane (NG-U) interface, which carries traffic data between the nodes of the NG-RAN 214 and a UPF 248 (e.g., N3 interface), and an NG control plane (NG-C) interface, which is a signaling interface between the nodes of the NG-RAN214 and an AMF 244 (e.g., N2 interface).

The NG-RAN 214 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 202 can be configured with multiple BWPs where each BWP configuration has a different SCS. When a BWP change is indicated to the UE 202, the SCS of the transmission is changed as well. Another use case example of BWP is related to power saving. In particular, multiple BWPs can be configured for the UE 202 with different amount of frequency resources (for example, PRBs) to support data transmission under different traffic loading scenarios. A BWP containing a smaller number of PRBs can be used for data transmission with small traffic load while allowing power saving at the UE 202 and in some cases at the gNB 216. A BWP containing a larger number of PRBs can be used for scenarios with higher traffic load.

The RAN 204 is communicatively coupled to CN 220 that includes network elements to provide various functions to support data and telecommunications services to customers/subscribers (for example, users of UE 202). The components of the CN 220 may be implemented in one physical node or separate physical nodes. In some embodiments, NFV may be utilized to virtualize any or all of the functions provided by the network elements of the CN 220 onto physical compute/storage resources in servers, switches, etc. A logical instantiation of the CN 220 may be referred to as a network slice, and a logical instantiation of a portion of the CN 220 may be referred to as a network sub-slice.

In some embodiments, the CN 220 may be an LTE CN 222, which may also be referred to as an EPC. The LTE CN 222 may include MME 224, SGW 226, SGSN 228, HSS 230, PGW 232, and PCRF 234 coupled with one another over interfaces (or "reference points") as shown. Functions of the elements of the LTE CN 222 may be briefly introduced as follows.

The MME 224 may implement mobility management functions to track a current location of the UE 202 to facilitate paging, bearer activation/deactivation, handovers, gateway selection, authentication, etc.

The SGW 226 may terminate an S1 interface toward the RAN and route data packets between the RAN and the LTE CN 222. The SGW 226 may be a local mobility anchor point for inter-RAN node handovers and also may provide an anchor for inter-3GPP mobility. Other responsibilities may include lawful intercept, charging, and some policy enforcement.

The SGSN 228 may track a location of the UE 202 and perform security functions and access control. In addition, the SGSN 228 may perform inter-EPC node signaling for mobility between different RAT networks; PDN and S-GW selection as specified by MME 224; MME selection for handovers; etc. The S3 reference point between the MME 224 and the SGSN 228 may enable user and bearer information exchange for inter-3GPP access network mobility in idle/active states.

The HSS 230 may include a database for network users, including subscription-related information to support the network entities' handling of communication sessions. The HSS 230 can provide support for routing/roaming, authentication, authorization, naming/addressing resolution, location dependencies, etc. An S6a reference point between the HSS 230 and the MME 224 may enable transfer of subscription and authentication data for authenticating/authorizing user access to the LTE CN 220.

The PGW 232 may terminate an SGi interface toward a data network (DN) 236 that may include an application/content server 238. The PGW 232 may route data packets between the LTE CN 222 and the data network 236. The PGW 232 may be coupled with the SGW 226 by an S5 reference point to facilitate user plane tunneling and tunnel management. The PGW 232 may further include a node for policy enforcement and charging data collection (for example, PCEF). Additionally, the SGi reference point between the PGW 232 and the data network 2 36 may be an operator external public, a private PDN, or an intra-operator packet data network, for example, for provision of IMS services. The PGW 232 may be coupled with a PCRF 234 via a Gx reference point.

The PCRF 234 is the policy and charging control element of the LTE CN 222. The PCRF 234 may be communicatively coupled to the app/content server 238 to determine appropriate QoS and charging parameters for service flows. The PCRF 232 may provision associated rules into a PCEF (via Gx reference point) with appropriate TFT and QCI.

In some embodiments, the CN 220 may be a 5GC 240. The 5GC 240 may include an AUSF 242, AMF 244, SMF 246, UPF 248, NSSF 250, NEF 252, NRF 254, PCF 256, UDM 258, and AF 260 coupled with one another over interfaces (or "reference points") as shown. Functions of the elements of the 5GC 240 may be briefly introduced as follows.

The AUSF 242 may store data for authentication of UE 202 and handle authentication-related functionality. The AUSF 242 may facilitate a common authentication framework for various access types. In addition to communicating with other elements of the 5GC 240 over reference points as shown, the AUSF 242 may exhibit an Nausf service-based interface.

The AMF 244 may allow other functions of the 5GC 240 to communicate with the UE 202 and the RAN 204 and to subscribe to notifications about mobility events with respect to the UE 202. The AMF 244 may be responsible for registration management (for example, for registering UE 202), connection management, reachability management, mobility management, lawful interception of AMF-related events, and access authentication and authorization. The AMF 244 may provide transport for SM messages between the UE 202 and the SMF 246, and act as a transparent proxy for routing SM messages. AMF 244 may also provide transport for SMS messages between UE 202 and an SMSF. AMF 244 may interact with the AUSF 242 and the UE 202 to perform various security anchor and context management functions. Furthermore, AMF 244 may be a termination point of a RAN CP interface, which may include or be an N2 reference point between the RAN 204 and the AMF 244; and the AMF 244 may be a termination point of NAS (N1) signaling, and perform NAS ciphering and integrity protection. AMF 244 may also support NAS signaling with the UE 202 over an N3 IWF interface.

The SMF 246 may be responsible for SM (for example, session establishment, tunnel management between UPF 248 and AN 208); UE IP address allocation and management (including optional authorization); selection and control of UP function; configuring traffic steering at UPF 248 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 244 over N2 to AN 208; and determining SSC mode of a session. SM may refer to management of a PDU session, and a PDU session or "session" may refer to a PDU connectivity service that provides or enables the exchange of PDUs between the UE 202 and the data network 236.

The UPF 248 may act as an anchor point for intra-RAT and inter-RAT mobility, an external PDU session point of interconnect to data network 236, and a branching point to support multi-homed PDU session. The UPF 248 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 248 may include an uplink classifier to support routing traffic flows to a data network.

The NSSF 250 may select a set of network slice instances serving the UE 202. The NSSF 250 may also determine allowed NSSAI and the mapping to the subscribed S-NS-SAIs, if needed. The NSSF 250 may also determine the AMF set to be used to serve the UE 202, or a list of candidate AMFs based on a suitable configuration and possibly by querying the NRF 254. The selection of a set of network slice instances for the UE 202 may be triggered by the AMF 244 with which the UE 202 is registered by interacting with the NSSF 250, which may lead to a change of AMF. The NSSF 250 may interact with the AMF 244 via an N22 reference point; and may communicate with another NSSF in a visited network via an N31 reference point (not shown). Additionally, the NSSF 250 may exhibit an Nnssf service-based interface.

The NEF 252 may securely expose services and capabilities provided by 3GPP network functions for third party, internal exposure/re-exposure, AFs (e.g., AF 260), edge computing or fog computing systems, etc. In such embodiments, the NEF 252 may authenticate, authorize, or throttle the AFs. NEF 252 may also translate information exchanged with the AF 260 and information exchanged with internal network functions. For example, the NEF 252 may translate between an AF-Service-Identifier and an internal 5GC information. NEF 252 may also receive information from other NFs based on exposed capabilities of other NFs. This information may be stored at the NEF 252 as structured data, or at a data storage NF using standardized interfaces. The stored information can then be re-exposed by the NEF 252 to other NFs and AFs, or used for other purposes such as analytics. Additionally, the NEF 252 may exhibit an Nnef service-based interface.

The NRF 254 may support service discovery functions, receive NF discovery requests from NF instances, and provide the information of the discovered NF instances to the NF instances. NRF 254 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 254 may exhibit the Nnrf service-based interface.

The PCF 256 may provide policy rules to control plane functions to enforce them, and may also support unified policy framework to govern network behavior. The PCF 256 may also implement a front end to access subscription information relevant for policy decisions in a UDR of the UDM 258. In addition to communicating with functions over reference points as shown, the PCF 256 exhibit an Npcf service-based interface.

The UDM 258 may handle subscription-related information to support the network entities' handling of communication sessions, and may store subscription data of UE 202. For example, subscription data may be communicated via an N8 reference point between the UDM 258 and the AMF 244. The UDM 258 may include two parts, an application front end and a UDR. The UDR may store subscription data and policy data for the UDM 258 and the PCF 256, and/or structured data for exposure and application data (including PFDs for application detection, application request information for multiple UEs 202) for the NEF 252. The Nudr service-based interface may be exhibited by the UDR 221 to allow the UDM 258, PCF 256, and NEF 252 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 258 may exhibit the Nudm service-based interface.

The AF 260 may provide application influence on traffic routing, provide access to NEF, and interact with the policy framework for policy control.

In some embodiments, the 5GC 240 may enable edge computing by selecting operator/3rd party services to be geographically close to a point that the UE 202 is attached to the network. This may reduce latency and load on the network. To provide edge-computing implementations, the 5GC 240 may select a UPF 248 close to the UE 202 and execute traffic steering from the UPF 248 to data network 236 via the N6 interface. This may be based on the UE subscription data, UE location, and information provided by the AF 260. In this way, the AF 260 may influence UPF (re) selection and traffic routing. Based on operator deployment, when AF 260 is considered to be a trusted entity, the network operator may permit AF 260 to interact directly with relevant NFs. Additionally, the AF 260 may exhibit an Naf service-based interface.

The data network 236 may represent various network operator services, Internet access, or third party services that may be provided by one or more servers including, for example, application/content server 238.

Figure 3:
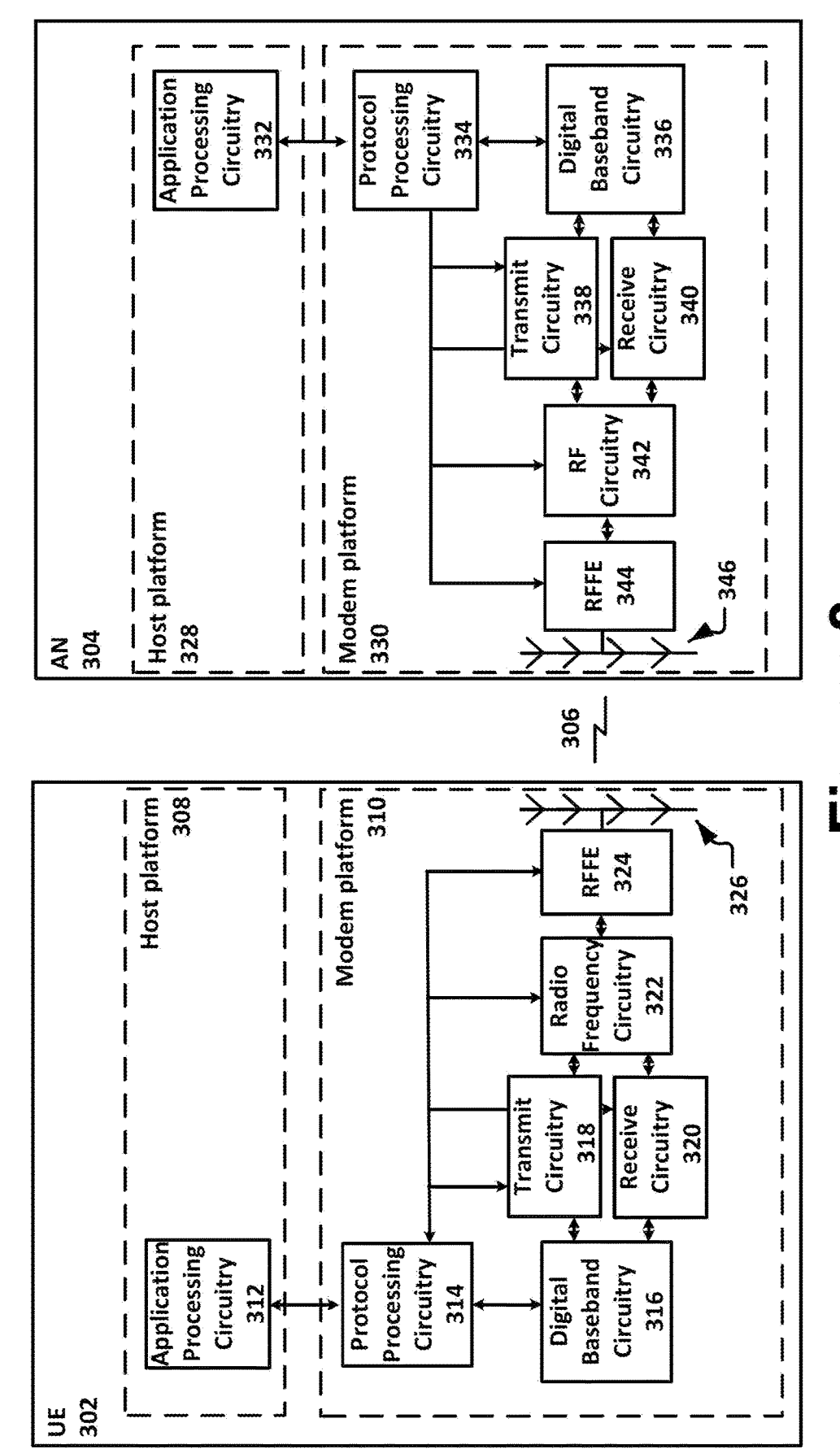
FIG. 3 schematically illustrates example components of a wireless network in accordance with various embodiments.

FIG. 3 schematically illustrates a wireless network 300 in accordance with various embodiments. The wireless network 300 may include a UE 302 in wireless communication with an AN 304. The UE 302 and AN 304 may be similar to, and substantially interchangeable with, like-named components described elsewhere herein.

The UE 302 may be communicatively coupled with the AN 304 via connection 306. The connection 306 is illustrated as an air interface to enable communicative coupling, and can be consistent with cellular communications protocols such as an LTE protocol or a 5G NR protocol operating at mmWave or sub-6 GHZ frequencies.

The UE 302 may include a host platform 308 coupled with a modem platform 310. The host platform 308 may include application processing circuitry 312, which may be coupled with protocol processing circuitry 314 of the modem platform 310. The application processing circuitry 312 may run various applications for the UE 302 that source/sink application data. The application processing circuitry 312 may further implement one or more layer operations to transmit/receive application data to/from a data network. These layer operations may include transport (for example UDP) and Internet (for example, IP) operations The protocol processing circuitry 314 may implement one or more of layer operations to facilitate transmission or reception of data over the connection 306. The layer operations implemented by the protocol processing circuitry 314 may include, for example, MAC, RLC, PDCP, RRC and NAS operations.

The modem platform 310 may further include digital baseband circuitry 316 that may implement one or more layer operations that are "below" layer operations performed by the protocol processing circuitry 314 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 310 may further include transmit circuitry 318, receive circuitry 320, RF circuitry 322, and RF front end (RFFE) 324, which may include or connect to one or more antenna panels 326. Briefly, the transmit circuitry 318 may include a digital-to-analog converter, mixer, intermediate frequency (IF) components, etc.; the receive circuitry 320 may include an analog-to-digital converter, mixer, IF components, etc.; the RF circuitry 322 may include a low-noise amplifier, a power amplifier, power tracking components, etc.; RFFE 324 may include filters (for example, surface/bulk acoustic wave filters), switches, antenna tuners, beamforming components (for example, phase-array antenna components), etc. The selection and arrangement of the components of the transmit circuitry 318, receive circuitry 320, RF circuitry 322, RFFE 324, and antenna panels 326 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 314 may include one or more instances of control circuitry (not shown) to provide control functions for the transmit/receive components.

A UE reception may be established by and via the antenna panels 326, RFFE 324, RF circuitry 322, receive circuitry 320, digital baseband circuitry 316, and protocol processing circuitry 314. In some embodiments, the antenna panels 326 may receive a transmission from the AN 304 by receive-beamforming signals received by a plurality of antennas/antenna elements of the one or more antenna panels 326.

A UE transmission may be established by and via the protocol processing circuitry 314, digital baseband circuitry 316, transmit circuitry 318, RF circuitry 322, RFFE 324, and antenna panels 326. In some embodiments, the transmit components of the UE 304 may apply a spatial filter to the data to be transmitted to form a transmit beam emitted by the antenna elements of the antenna panels 326.

Similar to the UE 302, the AN 304 may include a host platform 328 coupled with a modem platform 330. The host platform 328 may include application processing circuitry 332 coupled with protocol processing circuitry 334 of the modem platform 330. The modem platform may further include digital baseband circuitry 336, transmit circuitry 338, receive circuitry 340, RF circuitry 342, RFFE circuitry 344, and antenna panels 346. The components of the AN 304 may be similar to and substantially interchangeable with like-named components of the UE 302. In addition to performing data transmission/reception as described above, the components of the AN 308 may perform various logical functions that include, for example, RNC functions such as radio bearer management, uplink and downlink dynamic radio resource management, and data packet scheduling.

Figure 4:
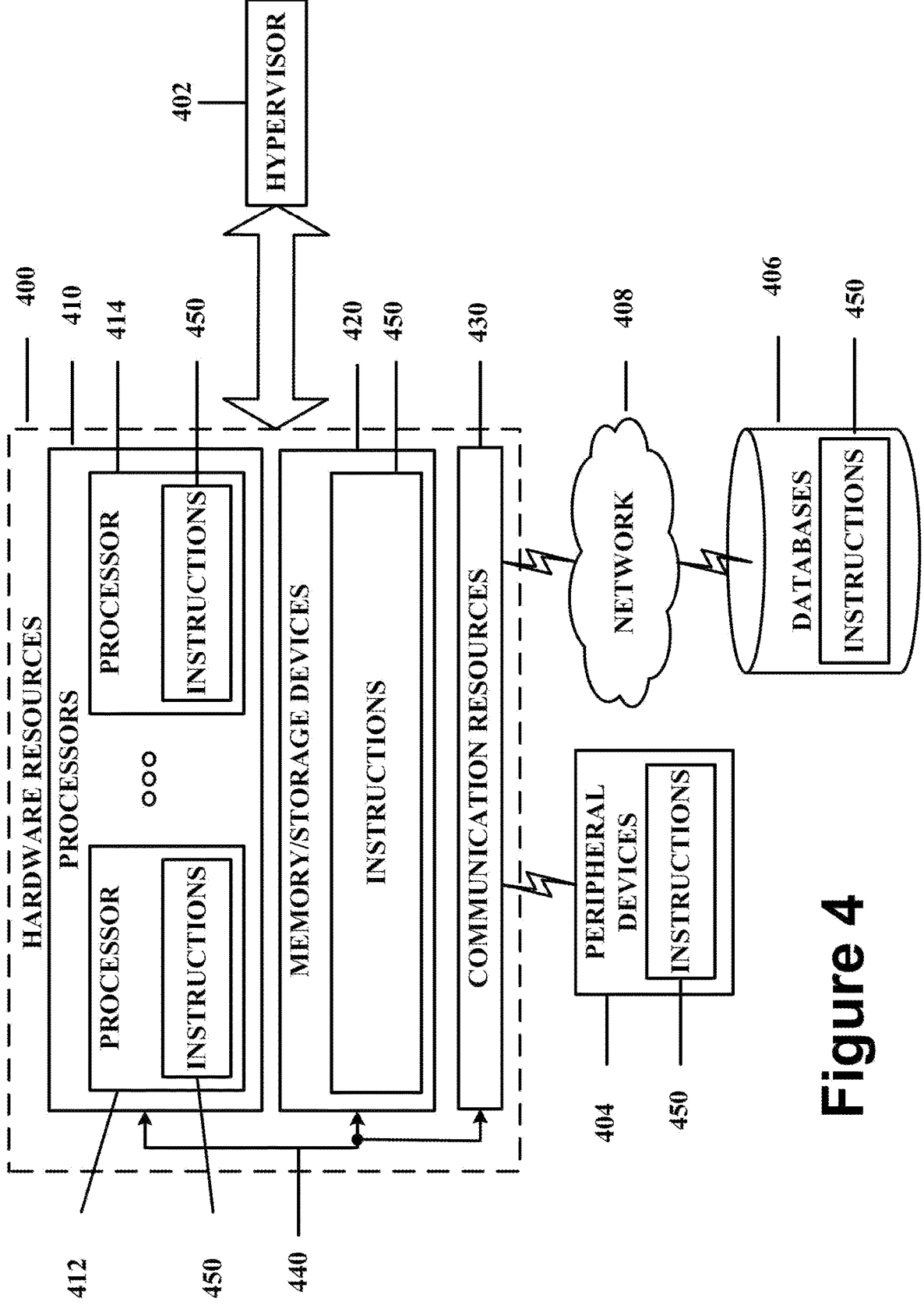
FIG. 4 is a block diagram illustrating example components, according to some embodiments, able to read instructions from a machine-readable or computer-readable medium (e.g., a non-transitory machine-readable storage medium) and perform any one or more of the methodologies discussed herein.

FIG. 4 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 4 shows a diagrammatic representation of hardware resources 400 including one or more processors (or processor cores) 410, one or more memory/storage devices 420, and one or more communication resources 430, each of which may be communicatively coupled via a bus 440 or other interface circuitry. For embodiments where node virtualization (e.g., NFV) is utilized, a hypervisor 402 may be executed to provide an execution environment for one or more network slices/subslices to utilize the hardware resources 400.

The processors 410 may include, for example, a processor 412 and a processor 414. The processors 410 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 420 may include main memory, disk storage, or any suitable combination thereof. The memory/storage devices 420 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 430 may include interconnection or network interface controllers, components, or other suitable devices to communicate with one or more peripheral devices 404 or one or more databases 406 or other network elements via a network 408. For example, the communication resources 430 may include wired communication components (e.g., for coupling via USB, Ethernet, etc.), cellular communication components, NFC components, Bluetooth® (or Bluetooth® Low Energy) components, Wi-Fi® components, and other communication components.

Instructions 450 may comprise software, a program, an application, an applet, an app, or other executable code for causing at least any of the processors 410 to perform any one or more of the methodologies discussed herein. The instructions 450 may reside, completely or partially, within at least one of the processors 410 (e.g., within the processor's cache memory), the memory/storage devices 420, or any suitable combination thereof. Furthermore, any portion of the instructions 450 may be transferred to the hardware resources 400 from any combination of the peripheral devices 404 or the databases 406. Accordingly, the memory of processors 410, the memory/storage devices 420, the peripheral devices 404, and the databases 406 are examples of computer-readable and machine-readable media. Figure Or1 provides a high-level view of an Open RAN (O-RAN) architecture Or100. The O-RAN architecture Or100 includes four O-RAN defined interfaces-namely, the A1 interface, the O1 interface, the O2 interface, and the Open Fronthaul Management (M)-plane interface-which connect the Service Management and Orchestration (SMO) framework Or102 to O-RAN network functions (NFs) Or104 and the O-Cloud Or106. The SMO Or102 (described in [O13]) also connects with an external system Or110, which provides enrichment data to the SMO Or102. Figure Or1 also illustrates that the A1 interface terminates at an O-RAN Non-Real Time (RT) RAN Intelligent Controller (RIC) Or112 in or at the SMO Or102 and at the O-RAN Near-RT RIC Or114 in or at the O-RAN NFs Or104. The O-RAN NFs Or104 can be VNFs such as VMs or containers, sitting above the O-Cloud Or106 and/or Physical Network Functions (PNFs) utilizing customized hardware. All O-RAN NFs Or104 are expected to support the O1 interface when interfacing the SMO framework Or102. The O-RAN NFs Or104 connect to the NG-Core Or108 via the NG interface (which is a 3GPP defined interface). The Open Fronthaul M-plane interface between the SMO Or102 and the O-RAN Radio Unit (O-RU) Or116 supports the O-RU Or116 management in the O-RAN hybrid model as specified in [O16]. The Open Fronthaul M-plane interface is an optional interface to the SMO Or102 that is included for backward compatibility purposes as per [O16], and is intended for management of the O-RU Or116 in hybrid mode only. The management architecture of flat mode [O12] and its relation to the O1 interface for the O-RU Or116 is for future study. The O-RU Or116 termination of the O1 interface towards the SMO Or102 as specified in [O12].

Figure 5:
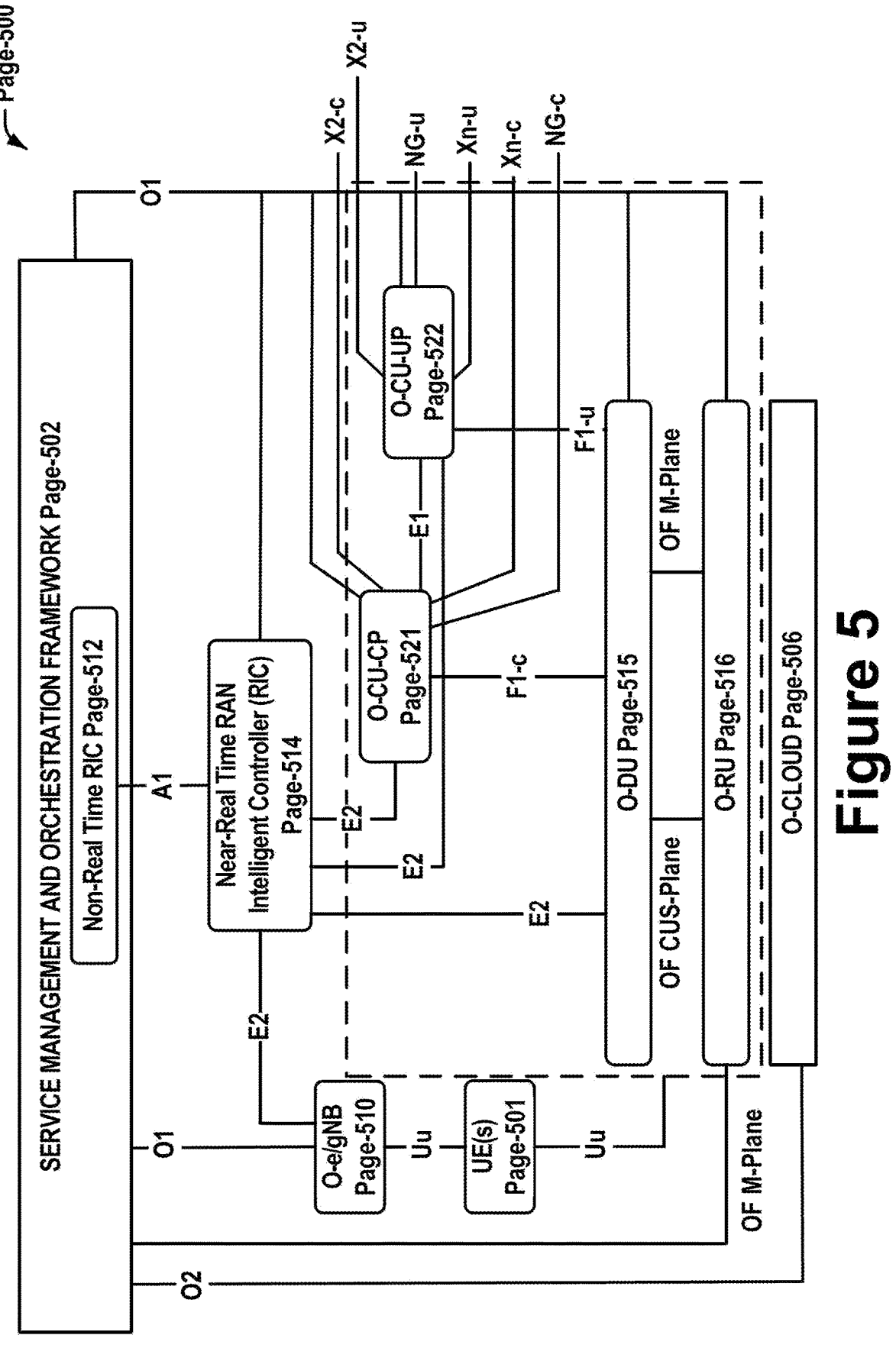
FIG. 5 shows the Uu interface between a UE 501 and O-e/gNB 510 as well as between the UE 501 and O-RAN components.

FIG. 5 shows an O-RAN logical architecture 500 corresponding to the O-RAN architecture Or100 of Figure Or1. In FIG. 5, the SMO 502 corresponds to the SMO Or102, O-Cloud 506 corresponds to the O-Cloud Or106, the non-RT RIC 512 corresponds to the non-RT RIC Or112, the near-RT RIC 514 corresponds to the near-RT RIC Or114, and the O-RU 516 corresponds to the O-RU Or116 of FIG. 5, respectively. The O-RAN logical architecture 500 includes a radio portion and a management portion.

The management portion/side of the architectures 500 includes the SMO Framework 502 containing the non-RT RIC 512, and may include the O-Cloud 506. The O-Cloud 506 is a cloud computing platform including a collection of physical infrastructure nodes to host the relevant O-RAN functions (e.g., the near-RT RIC 514, O-CU-CP 521, O-CU-UP 522, and the O-DU 515), supporting software components (e.g., OSs, VMMs, container runtime engines, ML engines, etc.), and appropriate management and orchestration functions.

The radio portion/side of the logical architecture 500 includes the near-RT RIC 514, the O-RAN Distributed Unit (O-DU) 515, the O-RU 516, the O-RAN Central Unit-Control Plane (O-CU-CP) 521, and the O-RAN Central Unit-User Plane (O-CU-UP) 522 functions. The radio portion/side of the logical architecture 500 may also include the O-e/gNB 510.

The O-DU 515 is a logical node hosting RLC, MAC, and higher PHY layer entities/elements (High-PHY layers) based on a lower layer functional split. The O-RU 516 is a logical node hosting lower PHY layer entities/elements (Low-PHY layer) (e.g., FFT/iFFT, PRACH extraction, etc.) and RF processing elements based on a lower layer functional split. Virtualization of O-RU 516 is FFS. The O-CU-CP 521 is a logical node hosting the RRC and the control plane (CP) part of the PDCP protocol. The O O-CU-UP 522 is a a logical node hosting the user plane part of the PDCP protocol and the SDAP protocol.

An E2 interface terminates at a plurality of E2 nodes. The E2 nodes are logical nodes/entities that terminate the E2 interface. For NR/5G access, the E2 nodes include the O-CU-CP 521, O-CU-UP 522, O-DU 515, or any combination of elements as defined in [O15]. For E-UTRA access the E2 nodes include the O-e/gNB 510. As shown in FIG. 5, the E2 interface also connects the O-e/gNB 510 to the Near-RT RIC 514. The protocols over E2 interface are based exclusively on Control Plane (CP) protocols. The E2 functions are grouped into the following categories: (a) near-RT RIC 514 services (REPORT, INSERT, CONTROL and POLICY, as described in [O15]); and (b) near-RT RIC 514 support functions, which include E2 Interface Management (E2 Setup, E2 Reset, Reporting of General Error Situations, etc.) and Near-RT RIC Service Update (e.g., capability exchange related to the list of E2 Node functions exposed over E2).

FIG. 5 shows the Uu interface between a UE 501 and O-e/gNB 510 as well as between the UE 501 and O-RAN components. The Uu interface is a 3GPP defined interface (see e.g., sections 5.2 and 5.3 of [O07]), which includes a complete protocol stack from L1 to L3 and terminates in the NG-RAN or E-UTRAN. The O-e/gNB 510 is an LTE eNB [O04], a 5G gNB or ng-eNB [O06] that supports the E2 interface. The O-e/gNB 510 may be the same or similar as another O-e and/or gNB discussed previously. The a UE 501 may correspond to any of the UEs discussed with respect to any of the Figures/embodiments above, and/or the like. There may be multiple UEs 501 and/or multiple O-e/gNB 510, each of which may be connected to one another the via respective Uu interfaces. Although not shown in FIG. 5, the O-e/gNB 510 supports O-DU 515 and O-RU 516 functions with an Open Fronthaul interface between them.

The Open Fronthaul (OF) interface(s) is/are between O-DU 515 and O-RU 516 functions [O17]. The OF interface(s) includes the Control User Synchronization (CUS) Plane and Management (M) Plane. Figures Or1 and 5 also show that the O-RU 516 terminates the OF M-Plane interface towards the O-DU 515 and optionally towards the SMO 502 as specified in [O16]. The O-RU 516 terminates the OF CUS-Plane interface towards the O-DU 515 and the SMO 502.

The F1-c interface connects the O-CU-CP 521 with the O-DU 515. As defined by 3GPP, the F1-c interface is between the gNB-CU-CP and gNB-DU nodes [O10]. However, for purposes of O-RAN, the F1-c interface is adopted between the O-CU-CP 521 with the O-DU 515 functions while reusing the principles and protocol stack defined by 3GPP and the definition of interoperability profile specifications.

The F1-u interface connects the O-CU-UP 522 with the O-DU 515. As defined by 3GPP, the F1-u interface is between the gNB-CU-UP and gNB-DU nodes [O10]. However, for purposes of O-RAN, the F1-u interface is adopted between the O-CU-UP 522 with the O-DU 515 functions while reusing the principles and protocol stack defined by 3GPP and the definition of interoperability profile specifications.

The NG-c interface is defined by 3GPP as an interface between the gNB-CU-CP and the AMF in the 5GC [O06]. The NG-c is also referred as the N2 interface (see [O06]). The NG-u interface is defined by 3GPP, as an interface between the gNB-CU-UP and the UPF in the 5GC The NG-u interface is referred as the N3 interface (see [O06]). In O-RAN, NG-c and NG-u protocol stacks defined by 3GPP are reused and may be adapted for O-RAN purposes.

The X2-c interface is defined in 3GPP for transmitting control plane information between eNBs or between eNB and en-gNB in EN-DC. The X2-u interface is defined in 3GPP for transmitting user plane information between eNBs or between eNB and en-gNB in EN-DC (see e.g., [O05], [O06]). In O-RAN, X2-c and X2-u protocol stacks defined by 3GPP are reused and may be adapted for O-RAN purposes The Xn-c interface is defined in 3GPP for transmitting control plane information between gNBs, ng-eNBs, or between an ng-eNB and gNB. The Xn-u interface is defined in 3GPP for transmitting user plane information between gNBs, ng-eNBs, or between ng-eNB and gNB (see e.g., [O06], [O08]). In O-RAN, Xn-c and Xn-u protocol stacks defined by 3GPP are reused and may be adapted for O-RAN purposes The E1 interface is defined by 3GPP as being an interface between the gNB-CU-CP (e.g., gNB-CU-CP 3728) and gNB-CU-UP (see e.g., [O07], [O09]). In O-RAN, E1 protocol stacks defined by 3GPP are reused and adapted as being an interface between the O-CU-CP 521 and the O-CU-UP 522 functions.

The O-RAN Non-Real Time (RT) RAN Intelligent Controller (RIC) 512 is a logical function within the SMO framework Or102, 502 that enables non-real-time control and optimization of RAN elements and resources; AI/machine learning (ML) workflow(s) including model training, inferences, and updates; and policy-based guidance of applications/features in the Near-RT RIC 514.

The O-RAN near-RT RIC 514 is a logical function that enables near-real-time control and optimization of RAN elements and resources via fine-grained data collection and actions over the E2 interface. The near-RT RIC 514 may include one or more AI/ML workflows including model training, inferences, and updates.

The non-RT RIC 512 can be an ML training host to host the training of one or more ML models. ML training can be performed offline using data collected from the RIC, O-DU 515 and O-RU 516. For supervised learning, non-RT RIC 512 is part of the SMO 502, and the ML training host and/or ML model host/actor can be part of the non-RT RIC 512 and/or the near-RT RIC 514. For unsupervised learning, the ML training host and ML model host/actor can be part of the non-RT RIC 512 and/or the near-RT RIC 514. For reinforcement learning, the ML training host and ML model host/actor may be co-located as part of the non-RT RIC 512 and/or the near-RT RIC 514. In some implementations, the non-RT RIC 512 may request or trigger ML model training in the training hosts regardless of where the model is deployed and executed. ML models may be trained and not currently deployed.

In some implementations, the non-RT RIC 512 provides a query-able catalog for an ML designer/developer to publish/install trained ML models (e.g., executable software components). In these implementations, the non-RT RIC 512 may provide discovery mechanism if a particular ML model can be executed in a target ML inference host (MF), and what number and type of ML models can be executed in the MF. For example, there may be three types of ML catalogs made discoverable by the non-RT RIC 512: a design-time catalog (e.g., residing outside the non-RT RIC 512 and hosted by some other ML platform(s)), a training/deployment-time catalog (e.g., residing inside the non-RT RIC 512), and a run-time catalog (e.g., residing inside the non-RT RIC 512). The non-RT RIC 512 supports necessary capabilities for ML model inference in support of ML assisted solutions running in the non-RT RIC 512 or some other ML inference host. These capabilities enable executable software to be installed such as VMs, containers, etc. The non-RT RIC 512 may also include and/or operate one or more ML engines, which are packaged software executable libraries that provide methods, routines, data types, etc., used to run ML models. The non-RT RIC 512 may also implement policies to switch and activate ML model instances under different operating conditions.

The non-RT RIC 52 is be able to access feedback data (e.g., FM and PM statistics) over the O1 interface on ML model performance and perform necessary evaluations. If the ML model fails during runtime, an alarm can be generated as feedback to the non-RT RIC 512. How well the ML model is performing in terms of prediction accuracy or other operating statistics it produces can also be sent to the non-RT RIC 512 over O1. The non-RT RIC 512 can also scale ML model instances running in a target MF over the O1 interface by observing resource utilization in MF. The environment where the ML model instance is running (e.g., the MF) monitors resource utilization of the running ML model. This can be done, for example, using an ORAN-SC component called ResourceMonitor in the near-RT RIC 514 and/or in the non-RT RIC 512, which continuously monitors resource utilization. If resources are low or fall below a certain threshold, the runtime environment in the near-RT RIC 514 and/or the non-RT RIC 512 provides a scaling mechanism to add more ML instances. The scaling mechanism may include a scaling factor such as an number, percentage, and/or other like data used to scale up/down the number of ML instances. ML model instances running in the target ML inference hosts may be automatically scaled by observing resource utilization in the MF. For example, the Kubernetes® (K8s) runtime environment typically provides an auto-scaling feature.

The A1 interface is between the non-RT RIC 512 (within or outside the SMO 502) and the near-RT RIC 514. The A1 interface supports three types of services as defined in [O14], including a Policy Management Service, an Enrichment Information Service, and ML Model Management Service. A1 policies have the following characteristics compared to persistent configuration [O14]: A1 policies are not critical to traffic; A1 policies have temporary validity; A1 policies may handle individual UE or dynamically defined groups of UEs; A1 policies act within and take precedence over the configuration; and A1 policies are non-persistent, i.e., do not survive a restart of the near-RT RIC.

[O04] 3GPP TS 36.401 v15.1.0 (2019-01-09).
[O05] 3GPP TS 36.420 v15.2.0 (2020-01-09).
[O06] 3GPP TS 38.300 v16.0.0 (2020-01-08).
[O07] 3GPP TS 38.401 v16.0.0 (2020-01-09).
[O08] 3GPP TS 38.420 v15.2.0 (2019-01-08).
[O09] 3GPP TS 38.460 v16.0.0 (2020-01-09).
[O10] 3GPP TS 38.470 v16.0.0 (2020-01-09).
[O12] O-RAN Alliance Working Group 1, O-RAN Operations and Maintenance Architecture Specification, version 2.0 (December 2019) ("O-RAN-WG1.OAM-Architecture-v02.00").
[O13] O-RAN Alliance Working Group 1, O-RAN Operations and Maintenance Interface Specification, version 2.0 (December 2019) ("O-RAN-WG1.O1-Interface-v02.00").
[O14] O-RAN Alliance Working Group 2, O-RAN A1 interface: General Aspects and Principles Specification, version 1.0 (October 2019) ("ORAN-WG2.A1.GA&P-v01.00").
[O15] O-RAN Alliance Working Group 3, Near-Real-time RAN Intelligent Controller Architecture & E2 General Aspects and Principles ("ORAN-WG3.E2GAP.0-v0.1").
[O16] O-RAN Alliance Working Group 4, O-RAN Fronthaul Management Plane Specification, version 2.0 (July 2019) ("ORAN-WG4.MP.0-v02.00.00").
[O17] O-RAN Alliance Working Group 4, O-RAN Fronthaul Control, User and Synchronization Plane Specification, version 2.0 (July 2019) ("ORAN-WG4.CUS.0-v02.00").

Example Procedures

Figure 6:
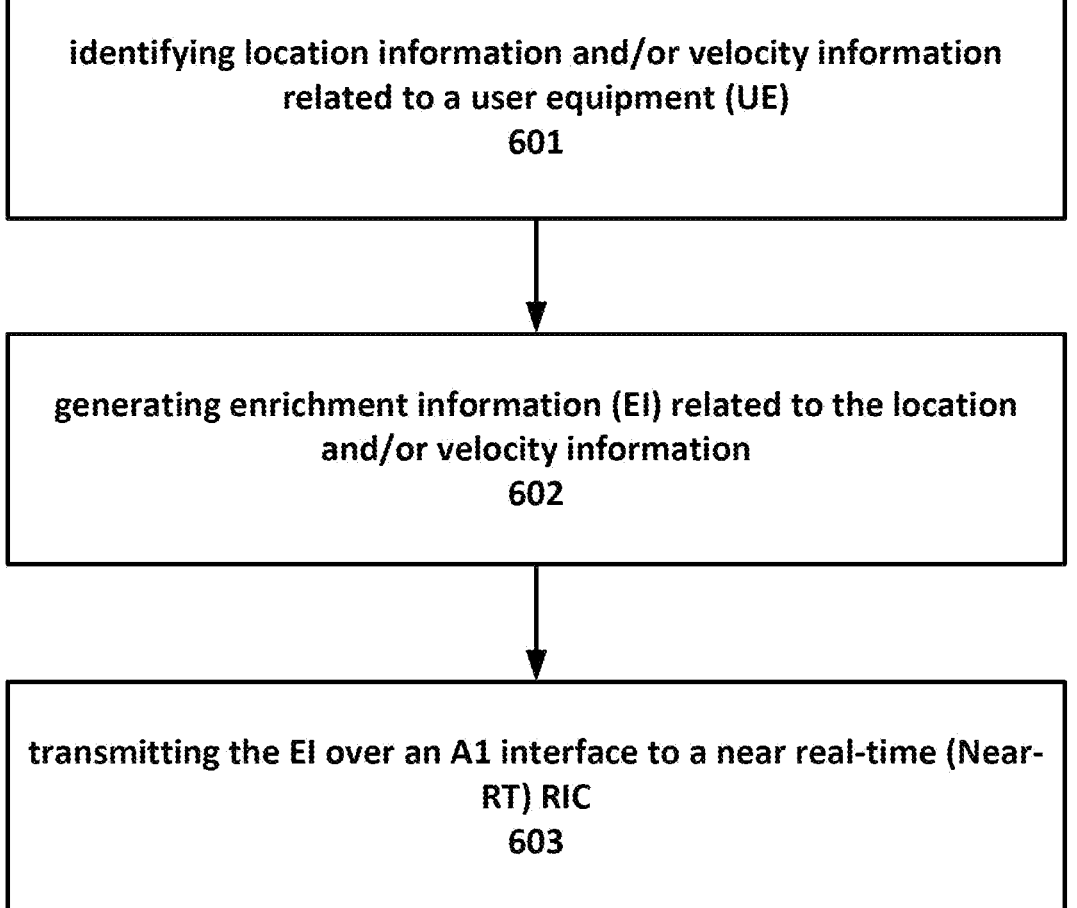
FIG. 6 depicts an example procedure for practicing the various embodiments discussed herein.

In some embodiments, the electronic device(s), network(s), system(s), chip(s) or component(s), or portions or implementations thereof, of FIGS. 2-4, OR1, and/or 5, or some other figure herein, may be configured to perform one or more processes, techniques, or methods as described herein, or portions thereof. One such process is depicted in FIG. 6. The process may relate to a method to be performed by a non real-time (Non-RT) radio access network (RAN) intelligent controller (RIC), one or more elements of a Non-RT RIC, and/or an electronic devices that includes or implements a Non-RT RIC. The process may include identifying, at 601, location information and/or velocity information related to a user equipment (UE); generating, at 602, enrichment information (EI) related to the location and/or velocity information; and transmitting, at 603, the EI over an A1 interface to a near real-time (Near-RT) RIC.

Another such process is depicted in FIG. 7. The process may relate to a method to be performed by a near real-time (Near-RT) radio access network (RAN) intelligent controller (RIC), one or more elements of a Near-RT RIC, and/or an electronic devices that includes or implements a Near-RT RIC. The process may include identifying, at 701, enhancement information (EI) received over an A1 interface from a non real-time (Non-RT) RIC; and identifying, at 702 based on the EI, location information and/or velocity information related to a user equipment (UE).

Figure 8:
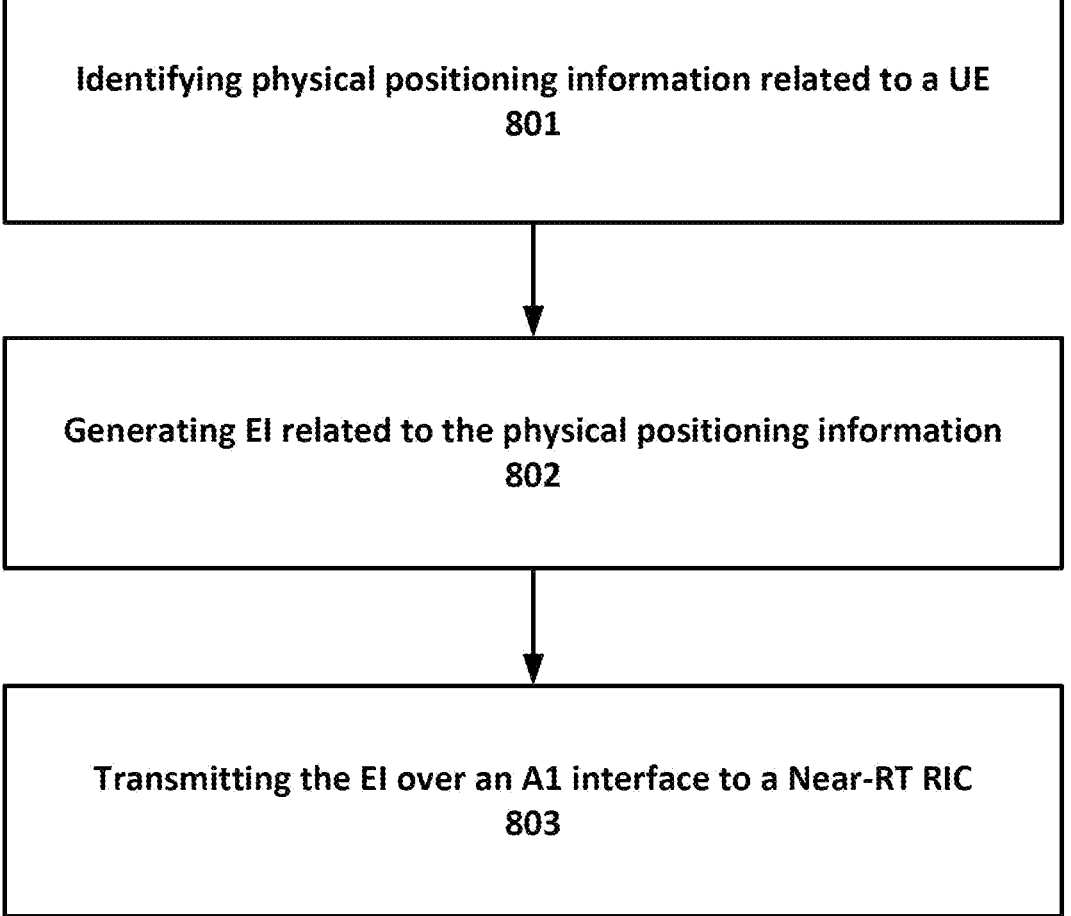
FIG. 8 depicts another example procedure for practicing the various embodiments discussed herein.

Another such process is depicted in FIG. 8. The process of FIG. 8 may relate to a method to be performed by a non real-time (Non-RT) radio access network (RAN) intelligent controller (RIC), one or more elements of a Non-RT RIC, and/or an electronic devices that includes or implements a Non-RT RIC. The process may include identifying, at 801, physical positioning information related to a user equipment (UE); generating, at 802, enrichment information (EI) related to the physical positioning information; and transmitting, at 803, the EI over an A1 interface to a near real-time (Near-RT) RIC.

Another such process is depicted in FIG. 9. The process of FIG. 9 may relate to a method to be performed by a near real-time (Near-RT) radio access network (RAN) intelligent controller (RIC), one or more elements of a Near-RT RIC, and/or an electronic devices that includes or implements a Near-RT RIC. The process may include identifying, at 901, enhancement information (EI) received over an A1 interface from a non real-time (Non-RT) RIC; and identifying, at 902 based on the EI, physical positioning information related to a user equipment (UE).

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Examples

Example 1 may include the UE location and velocity information is communicated as A1 enrichment information, which can be provided by the Non-RT RIC to the Near-RT RIC Example 2 may include in one embodiment, UE location is described by the following GAD shapes Ellipsoid point
Ellipsoid point with uncertainty circle
Ellipsoid point with uncertainty ellipse
Polygon
Ellipsoid point with altitude
Ellipsoid point with altitude and uncertainty ellipsoid
Ellipsoid arc Example 3 may include in one embodiment, UE velocity information is described by the following alternatives Horizontal Velocity
Horizontal and Vertical Velocity Horizontal Velocity with Uncertainty
Horizontal and Vertical Velocity with Uncertainty Example 4 may include in one embodiment, a single EI type is defined for UE location and velocity information A1 EI.

Example 5 may include based on example 4 or some other example herein, wherein the Non-RT RIC use the EI Type Object in the EI Type query response to indicate its supported GAD shapes, whether it can provide UE velocity information, and supported velocity description (if velocity information is available).

Example 6 may include based on example 4 or some other example herein, wherein the Near-RT RIC use the EI Job Object in the EI Job creation request to indicate its selected GAD shapes, whether it request UE velocity information and selected velocity description (if velocity information is required).

Example 7 may include in one embodiment, one EI type is defined for UE location information, and another EI type is defined for UE velocity information.

Example 8 may include in one embodiment, EI types are defined for various combination of GAD shapes and velocity descriptions. One EI type supports one type of GAD shape without velocity description or one type of GAD shape with one type of velocity description Example 9 may include in one embodiment, the EI Results contains the following attributes UE Identifier
Time stamp
UE location information
UE velocity information Example 10 may include based on examples 9 and 4 or some other example herein, wherein the data type for UE location information is based on Near-RT RIC's selection during EI Job creation.

Example 11 may include based on example 9 and 4 or some other example herein, wherein the data type for UE velocity information is based on Near-RT RIC's selection during EI Job creation.

Example 12 may include based on examples 9 and 8 or some other example herein, whereiin the data type for UE location information is based on EI type.

Example 13 may include the based on examples 9 and 8 or some other example herein, wherein the data type for UE velocity information is based on EI type.

Example 14 may include based on example 9 or some other example herein, wherein in one embodiment, one EI Results Object contains the UE location and velocity information for a single UE at a single time instance Example 15 may include based on example 9 or some other example herein, wherein in one embodiment, one EI Results Object contains the UE location and velocity information for a group of UEs at a single time instance Example 16 may include based on example 9 or some other example herein, wherein in one embodiment, one EI Results Object contains the UE location and velocity information for a single UEs at multiple time instances Example 17 may include a method to be performed by a non real-time (Non-RT) radio access network (RAN) intelligent controller (RIC), one or more elements of a Non-RT RIC, and/or an electronic devices that includes or implements a Non-RT RIC, wherein the method comprises: identifying location information and/or velocity information related to a user equipment (UE); generating enrichment information (EI) related to the location and/or velocity information; and transmitting the EI over an A1 interface to a near real-time (Near-RT) RIC.

Example 18 may include the method of example 17 and/or some other example herein, wherein the EI related to the location information is based on a geographical area description (GAD) shape.

Example 19 may include the method of any of examples 17-18, and/or some other example herein, wherein the EI related to the velocity information includes one or more of horizontal velocity information, vertical velocity information, and uncertainty information.

Example 20 may include a method to be performed by a near real-time (Near-RT) radio access network (RAN) intelligent controller (RIC), one or more elements of a Near-RT RIC, and/or an electronic devices that includes or implements a Near-RT RIC, wherein the method comprises: identifying enhancement information (EI) received over an A1 interface from a non real-time (Non-RT) RIC; and identifying, based on the EI, location information and/or velocity information related to a user equipment (UE).

Example 21 may include the method of example 20 and/or some other example herein, wherein the EI related to the location information is based on a geographical area description (GAD) shape.

Example 22 may include the method of any of examples 20-21, and/or some other example herein, wherein the EI related to the velocity information includes one or more of horizontal velocity information, vertical velocity information, and uncertainty information.

Example 23 includes a method to be performed by a non real-time (Non-RT) radio access network (RAN) intelligent controller (RIC), one or more elements of a Non-RT RIC, and/or an electronic devices that includes or implements a Non-RT RIC, wherein the method comprises: identifying physical positioning information related to a user equipment (UE); generating enrichment information (EI) related to the physical positioning information; and transmitting the EI over an A1 interface to a near real-time (Near-RT) RIC.

Example 24 includes the method of example 23, and/or some other example herein, wherein the physical positioning information is location information of the UE.

Example 25 includes the method of example 24, and/or some other example herein, wherein the EI related to the location information is based on a geographical area description (GAD) shape.

Example 26 includes the method of example 25, and/or some other example herein, wherein the GAD shape is related to an ellipsoid point, a polygon, or an ellipsoid arc Example 27 includes the method of any of examples 23-26, and/or some other example herein, wherein the physical positioning information includes velocity information of the UE.

Example 28 includes the method of example 27, and/or some other example herein, wherein the velocity information includes horizontal velocity information, vertical velocity information, or uncertainty information.

Example 29 includes the method of any of examples 23-28, and/or some other example herein, wherein: the physical positioning information includes location information of the UE and velocity information of the UE; and generating the EI includes generating a first EI related to the location information and a second EI related to the velocity information, wherein the first EI has a same type as the second EI.

Example 30 includes the method of any of examples 23-28, and/or some other example herein, wherein: the physical positioning information includes location information of the UE and velocity information of the UE; and generating the EI includes generating a first EI related to the location information and a second EI related to the velocity information, wherein the first EI has a different type than a type of the second EI.

Example 31 includes the method of any of examples 23-30, and/or some other example herein, wherein the method further comprises: transmitting, to the Near-RT RIC, an indication of an EI type definition that is related to what physical positioning information the Non-RT RIC is configured to provide to the Near-RT RIC.

Example 32 includes the method of example 31, and/or some other example herein, wherein the EI type definition indicates: whether the Non-RT RIC is configured to provide velocity information; what types of location information the Non-RT RIC is configured to provide; or what types of velocity information the Non-RT RIC is configured provide.

Example 33 includes the method of example 31, and/or some other example herein, further comprising: identifying, from the Near-RT RIC, a request for an EI, wherein the request is based on the EI type definition; and generating the EI based on the request.

Example 34 includes the method of any of examples 23-33, and/or some other example herein, wherein the EI includes an indication of a UE identifier of the UE.

Example 35 includes the method of any of examples 23-34, and/or some other example herein, wherein the EI includes an indication of a time stamp related to the physical positioning information.

Example 36 includes a method to be performed by a near real-time (Near-RT) radio access network (RAN) intelligent controller (RIC), one or more elements of a Near-RT RIC, and/or an electronic devices that includes or implements a Near-RT RIC, wherein the method comprises: identifying enhancement information (EI) received over an A1 interface from a non real-time (Non-RT) RIC; and identifying, based on the EI, physical positioning information related to a user equipment (UE).

Example 37 includes the method of example 36, and/or some other example herein, wherein the physical positioning information is location information of the UE.

Example 38 includes the method of example 37, and/or some other example herein, wherein the EI related to the location information is based on a geographical area description (GAD) shape.

Example 39 includes the method of example 38, and/or some other example herein, wherein the GAD shape is related to an ellipsoid point, a polygon, or an ellipsoid arc Example 40 includes the method of any of examples 36-39, and/or some other example herein, wherein the physical positioning information includes velocity information of the UE.

Example 41 includes the method of example 40, and/or some other example herein, wherein the velocity information includes horizontal velocity information, vertical velocity information, or uncertainty information.

Example 42 includes the method of any of examples 36-41, and/or some other example herein, wherein: the physical positioning information includes location information of the UE and velocity information of the UE; the EI is a first EI related to the location information, and the first EI is in accordance with a first type; and wherein the method further comprises identifying a second EI related to the velocity information, and the second EI is in accordance with the first type.

Example 43 includes the method of any of examples 36-41, and/or some other example herein, wherein: the physical positioning information includes location information of the UE and velocity information of the UE; the EI is a first EI related to the location information, and the first EI is in accordance with a first type; and wherein the method further comprises identifying a second EI related to the velocity information, and the second EI is in accordance with a second type.

Example 44 includes the method of any of examples 36-43, and/or some other example herein, wherein the method further comprises: identifying, from the Non-RT RIC, an indication of an EI type definition that is related to what physical positioning information the Non-RT RIC is configured to provide to the Near-RT RIC.

Example 45 includes the method of example 44, and/or some other example herein, wherein the EI type definition indicates: whether the Non-RT RIC is configured to provide velocity information; what types of location information the Non-RT RIC is configured to provide; or what types of velocity information the Non-RT RIC is configured provide.

Example 46 includes the method of any of examples 36-45, and/or some other example herein, further comprising: transmitting, to the Non-RT RIC, a request for an EI, wherein the request is based on the EI type definition; and wherein the EI is generated based on the request.

Example 47 includes the method of any of examples 36-46, and/or some other example herein, wherein the EI includes an indication of a UE identifier of the UE.

Example 48 includes the method of any of examples 36-47, and/or some other example herein, wherein the EI includes an indication of a time stamp related to the physical positioning information.

Example Z01 may include an apparatus comprising means to perform one or more elements of a method described in or related to any of examples 1-48, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-48, or any other method or process described herein.

Example Z03 may include an apparatus comprising logic, modules, or circuitry to perform one or more elements of a method described in or related to any of examples 1-48, or any other method or process described herein.

Example Z04 may include a method, technique, or process as described in or related to any of examples 1-48, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-48, or portions thereof.

Example Z06 may include a signal as described in or related to any of examples 1-48, or portions or parts thereof.

Example Z07 may include a datagram, packet, frame, segment, protocol data unit (PDU), or message as described in or related to any of examples 1-48, or portions or parts thereof, or otherwise described in the present disclosure.

Example Z08 may include a signal encoded with data as described in or related to any of examples 1-48, or portions or parts thereof, or otherwise described in the present disclosure.

Example Z09 may include a signal encoded with a datagram, packet, frame, segment, protocol data unit (PDU), or message as described in or related to any of examples 1-48, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-48, or portions thereof.

Example Z11 may include a computer program comprising instructions, wherein execution of the program by a processing element is to cause the processing element to carry out the method, techniques, or process as described in or related to any of examples 1-48, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

| | | |
|---|---|---|
| 3GPP Third Generation Partnership Project | Retention Priority | CA Carrier Aggregation, Certification |
| 4G Fourth Generation | ARQ Automatic Repeat Request | Authority |
| 5G Fifth Generation | AS Access Stratum | CAPEX CAPital |
| 5GC 5G Core network | ASP Application | EXpenditure |
| AC Application Client | Service Provider | CBRA Contention Based Random Access |
| ACR Application Context Relocation | ASN.1 Abstract Syntax Notation One | CC Component Carrier, Country Code, |
| ACK Acknowledgement | AUSF Authentication | Cryptographic |
| ACID Application Client Identification | Server Function | Checksum |
| AF Application | AWGN Additive White Gaussian Noise | CCA Clear Channel Assessment |
| Function | BAP Backhaul | CCE Control Channel |
| AM Acknowledged | Adaptation Protocol | Element |
| Mode | BCH Broadcast Channel | CCCH Common Control |

-continued

AMBRAggregate Maximum Bit Rate

AMF Access and Mobility Management Function

AN Access Network

ANR Automatic Neighbour Relation

AOA Angle of Arrival

AP Application Protocol, Antenna Port, Access Point

API Application Programming Interface

APN Access Point Name

ARP Allocation and

CHF Charging Function

CI Cell Identity

CID Cell-ID (e.g., positioning method)

CIM Common Information Model

CIR Carrier to Interference Ratio

CK Cipher Key

CM Connection Management, Conditional Mandatory

CMAS Commercial Mobile Alert Service

CMD Command

CMS Cloud Management System

CO Conditional Optional

COMP Coordinated Multi-Point

CORESET Control Resource Set

COTS Commercial Off-The-Shelf

CP Control Plane, Cyclic Prefix, Connection Point

CPD Connection Point Descriptor

CPE Customer Premise Equipment

DM-RS, DMRS Demodulation Reference Signal

DN Data network

DNN Data Network Name

DNAI Data Network Access Identifier

DRB Data Radio Bearer

DRS Discovery Reference Signal

DRX Discontinuous Reception

DSL Domain Specific Language. Digital Subscriber Line

DSLAM DSL Access Multiplexer

DwPTS Downlink Pilot Time Slot

E-LAN Ethernet Local Area Network

E2E End-to-End

EAS Edge Application Server

ECCA extended clear channel assessment, extended CCA

BER Bit Error Ratio

BFD Beam Failure Detection

BLER Block Error Rate

BPSK Binary Phase Shift Keying

BRAS Broadband Remote Access Server

BSS Business Support System

BS Base Station

BSR Buffer Status Report

BW Bandwidth

BWP Bandwidth Part

C-RNTI Cell Radio Network Temporary Identity

CPICHCommon Pilot Channel

CQI Channel Quality Indicator

CPU CSI processing unit, Central Processing Unit

C/R Command/Response field bit

CRAN Cloud Radio Access Network, Cloud RAN

CRB Common Resource Block

CRC Cyclic Redundancy Check

CRI Channel-State Information Resource Indicator, CSI-RS Resource Indicator

C-RNTI Cell RNTI

CS Circuit Switched

CSCF call session control function

CSAR Cloud Service Archive

CSI Channel-State Information

CSI-IM CSI Interference Measurement

CSI-RS CSI Reference Signal

EDGE Enhanced Datarates for GSM Evolution (GSM Evolution)

EAS Edge Application Server

EASID Edge Application Server Identification

ECS Edge Configuration Server

ECSP Edge Computing Service Provider

EDN Edge Data Network

EEC Edge Enabler Client

EECID Edge Enabler Client Identification

EES Edge Enabler Server

EESID Edge Enabler Server Identification

EHE Edge Hosting Environment

EGMF Exposure Governance Management

Channel

CE Coverage Enhancement

CDM Content Delivery Network

CDMA Code-Division Multiple Access

CDR Charging Data Request

CDR Charging Data Response

CFRA Contention Free Random Access

CG Cell Group

CGF Charging Gateway Function

CSI-RSRP CSI reference signal received power

CSI-RSRQ CSI reference signal received quality

CSI-SINR CSI signal-to-noise and interference ratio

CSMA Carrier Sense Multiple Access

CSMA/CA CSMA with collision avoidance

CSS Common Search Space, Cell- specific Search Space

CTF Charging Trigger Function

CTS Clear-to-Send

CW Codeword

CWS Contention Window Size

D2D Device-to-Device

DC Dual Connectivity, Direct Current

DCI Downlink Control Information

DF Deployment Flavour

DL Downlink

DMTF Distributed Management Task Force

DPDK Data Plane Development Kit

Register eLAA enhanced Licensed Assisted Access, enhanced LAA

EM Element Manager eMBB Enhanced Mobile Broadband

EMS Element Management System eNB evolved NodeB, E-UTRAN Node B

EN-DC E-UTRA-NR Dual Connectivity

EPC Evolved Packet Core

EPDCCH enhanced PDCCH, enhanced Physical Downlink Control Cannel

EPRE Energy per resource element

EPS Evolved Packet System

EREG enhanced REG, enhanced resource element groups

ETSI European Telecommunications Standards Institute

-continued

| | | |
|---|---|---|
| ECCE Enhanced Control Channel Element, Enhanced CCE | Function | ETWS Earthquake and Tsunami Warning System |
| ED Energy Detection embedded Universal Integrated Circuit Card | EGPRS Enhanced GPRS | eUICC embedded UICC, Sputnikovaya Sistema (Engl.: |
| | EIR Equipment Identity Correction CHannel | |
| E-UTRA Evolved UTRA | FDD Frequency Division Duplex | Global Navigation Satellite System) |
| E-UTRAN Evolved UTRAN | FDM Frequency Division Multiplex | gNB Next Generation NodeB |
| EV2X Enhanced V2X | FDMA Frequency Division Multiple Access | gNB-CU gNB-centralized unit, Next Generation NodeB |
| F1AP F1 Application Protocol | FE Front End FEC Forward Error Correction | centralized unit |
| F1-C F1 Control plane interface | FFS For Further Study | gNB-DU gNB-distributed unit, Next |
| F1-U F1 User plane interface | FFT Fast Fourier Transformation | Generation NodeB distributed unit |
| FACCH Fast Associated Control CHannel | feLAA further enhanced Licensed Assisted Access, further | GNSS Global Navigation Satellite System |
| FACCH/F Fast Associated Control Channel/Full rate | enhanced LAA FN Frame Number FPGA Field-Programmable | GPRS General Packet Radio Service GPSI Generic |
| FACCH/H Fast Associated Control Channel/Half rate | Gate Array FR Frequency Range FQDN Fully Qualified | Public Subscription Identifier GSM Global System for |
| FACH Forward Access Channel | Domain Name G-RNTI GERAN | Mobile Communications, |
| FAUSCH Fast Uplink Signalling Channel | Radio Network Temporary Identity | Groupe Special Mobile |
| FB Functional Block | GERAN GSM EDGE RAN, GSM EDGE Radio | GTP GPRS Tunneling Protocol |
| FBI Feedback Information | Access Network | GTP-UGPRS Tunnelling Protocol for User |
| FCC Federal Communications Commission | GGSN Gateway GPRS Support Node | Plane |
| FCCH Frequency | GLONASS GLObal'naya NAvigatsionnaya | GTS Go To Sleep Signal (related to WUS) |
| GUMMEI Globally Unique MME Identifier | http/1.1 over SSL, i.e. port 443) | IMC IMS Credentials IMEI International Mobile |
| GUTI Globally Unique Temporary UE Identity | I-Block Information Block | Equipment Identity IMGI International mobile |
| HARQ Hybrid ARQ, Hybrid Automatic | ICCID Integrated Circuit Card Identification | group identity IMPI IP Multimedia |
| Repeat Request | IAB Integrated Access and Backhaul | Private Identity IMPU IP Multimedia |
| HANDO Handover | ICIC Inter-Cell | PUblic identity |
| HFN HyperFrame Number | Interference Coordination | IMS IP Multimedia Subsystem |
| HHO Hard Handover | ID Identity, identifier | |
| HLR Home Location Register | IDFT Inverse Discrete Fourier Transform | IMSI International Mobile Subscriber Identity |
| HN Home Network | IE Information element | IoT Internet of Things |
| HO Handover | IBE In-Band Emission | IP Internet Protocol |
| HPLMN Home Public Land Mobile Network | IEEE Institute of Electrical and Electronics | Ipsec IP Security, Internet Protocol Security |
| HSDPA High Speed Downlink Packet Access | Engineers | IP-CAN IP-Connectivity Access Network |
| HSN Hopping Sequence Number | IEI Information Element Identifier | IP-M IP Multicast |
| HSPA High Speed Packet Access | IEIDL Information Element Identifier Data Length | IPv4 Internet Protocol Version 4 IPv6 Internet Protocol |
| HSS Home Subscriber Server | IETF Internet Engineering Task Force | Version 6 IR Infrared |
| HSUPA High Speed Uplink Packet Access | IF Infrastructure IIOT Industrial Internet of | IS In Sync IRP Integration |
| HTTP Hyper Text Transfer Protocol | Things IM Interference | Reference Point ISDN Integrated Services |
| HTTPS Hyper Text Transfer Protocol Secure (https is | Measurement, Intermodulation, IP Multimedia | Digital Network ISIM IM Services Identity Module |
| ISO International Organisation for Standardisation | L2 Layer 2 (data link layer) | IPsec Tunnel LTE Long Term Evolution |
| ISP Internet Service Provider | L3 Layer 3 (network layer) | M2M Machine-to-Machine |
| IWF Interworking-Function | LAA Licensed Assisted Access | MAC Medium Access Control (protocol |
| I-WLAN Interworking WLAN | LAN Local Area Network LADN Local Area Data Network | layering context) MAC Message |

Constraint length of
the convolutional code,
USIM Individual key
kB Kilobyte (1000
bytes)
kbps kilo-bits per second
Kc Ciphering key
Ki Individual
subscriber
authentication key
KPI Key Performance
Indicator
KQI Key Quality
Indicator
KSI Key Set Identifier
ksps kilo-symbols per
second
KVM Kernel Virtual
Machine
L1 Layer 1 (physical
layer)
L1-RSRP Layer 1
reference signal
received power
Occupancy Time
MCS Modulation and
coding scheme
MDAFManagement Data
Analytics Function
MDAS Management Data
Analytics Service
MDT Minimization of
Drive Tests
ME Mobile Equipment
MeNB master eNB
MER Message Error Ratio
MGL Measurement Gap
Length
MGRP Measurement Gap
Repetition Period
MIB Master Information
Block, Management
Information Base
MIMO Multiple Input
Multiple Output
MLC Mobile Location
Centre
MM Mobility
Management
MME Mobility
Management Entity
MN Master Node
MNO Mobile
Network Operator
MO Measurement
Object, Mobile
Originated
Forwarding Path
Descriptor
NFV Network Functions
Virtualization
NFVI NFV Infrastructure
NFVO NFV Orchestrator
NG Next Generation,
Next Gen
NGEN-DC NG-RAN E-
UTRA-NR Dual
Connectivity
NM Network Manager
NMS Network
Management System
N-POP Network Point of
Presence
NMIB, N-MIB Narrowband
MIB
NPBCH Narrowband
Physical Broadcast
CHannel
NPDCCH Narrowband LBT Listen Before Talk
LCM LifeCycle
Management
LCR Low Chip Rate
LCS Location Services
LCID Logical
Channel ID
LI Layer Indicator
LLC Logical Link
Control, Low Layer
Compatibility
LMF Location
Management Function
LOS Line of Sight
LPLMN Local PLMN
LPP LTE Positioning
Protocol
LSB Least Significant Bit
LTE Long Term
Evolution
LWA LTE-WLAN
aggregation
LWIP LTE/WLAN Radio
Level Integration with
MPBCH MTC
Physical Broadcast
CHannel
MPDCCH MTC
Physical Downlink
Control CHannel
MPDSCH MTC
Physical Downlink
Shared CHannel
MPRACH MTC
Physical Random
Access CHannel
MPUSCH MTC
Physical Uplink Shared
Channel
MPLS MultiProtocol Label
Switching
MS Mobile Station
MSB Most Significant Bit
MSC Mobile Switching
Centre
MSI Minimum System
Information, MCH
Scheduling
Information
MSID Mobile Station
Identifier
MSIN Mobile Station
Identification
Number
MSISDN Mobile
Subscriber ISDN
Number
NPSS Narrowband
Primary
Synchronization
Signal
NSSS Narrowband
Secondary
Synchronization
Signal
NR New Radio,
Neighbour Relation
NRF NF Repository
Function
NRS Narrowband
Reference Signal
NS Network Service
NSA Non-Standalone
operation mode
NSD Network Service
Descriptor
NSR Network Service
Record
NSSAINetwork Slice authentication code
(security/encryption
context)
MAC-A MAC used
for authentication and
key agreement (TSG T
WG3 context)
MAC-IMAC used for data
integrity of signalling
messages (TSG T
WG3 context)
MANO Management
and Orchestration
MBMS Multimedia
Broadcast and Multicast
Service
MBSFN Multimedia
Broadcast multicast
service Single Frequency
Network
MCC Mobile Country
Code
MCG Master Cell Group
MCOT Maximum Channel
MT Mobile Terminated,
Mobile Termination
MTC Machine-Type
Communications
mMTCmassive MTC,
massive Machine-
Type Communications
MU-MIMO Multi User
MIMO
MWUS MTC wake-
up signal, MTC WUS
NACK Negative
Acknowledgement
NAI Network Access
Identifier
NAS Non-Access
Stratum, Non- Access
Stratum layer
NCT Network
Connectivity Topology
NC-JT Non-
Coherent Joint
Transmission
NEC Network Capability
Exposure
NE-DC NR-E-UTRA
Dual Connectivity
NEF Network Exposure
Function
NF Network Function
NFP Network
Forwarding Path
NFPD Network
O&M Operation and
Maintenance
ODU2 Optical channel
Data Unit - type 2
OFDM Orthogonal
Frequency Division
Multiplexing
OFDMA Orthogonal
Frequency Division
Multiple Access
OOB Out-of-band
OOS Out of Sync
OPEX OPerating EXpense
OSI Other System
Information
OSS Operations Support
System
OTA over-the-air
PAPR Peak-to-Average
Power Ratio
PAR Peak to Average
Ratio -continued

| | | |
|---|---|---|
| Physical Downlink Control CHannel | Selection Assistance Information | PBCH Physical Broadcast Channel |
| NPDSCH Narrowband Physical Downlink Shared CHannel | S-NNSAI Single-NSSAI | PC Power Control, Personal Computer |
| NPRACH Narrowband Physical Random Access CHannel | NSSF Network Slice Selection Function NW Network | PCC Primary Component Carrier, Primary CC P-CSCF Proxy CSCF |
| NPUSCH Narrowband Physical Uplink Shared CHannel | NWUSNarrowband wake-up signal, Narrowband WUS | PCell Primary Cell PCI Physical Cell ID, Physical Cell Identity |
| Enforcement Function | NZP Non-Zero Power Network | PCEF Policy and Charging Sidelink Broadcast |
| PCF Policy Control Function | PIN Personal Identification Number | Channel PSDCH Physical |
| PCRF Policy Control and Charging Rules Function | PM Performance Measurement PMI Precoding Matrix Indicator | Sidelink Downlink Channel PSCCH Physical Sidelink Control |
| PDCP Packet Data Convergence Protocol, Packet Data Convergence Protocol layer | PNF Physical Network Function PNFD Physical Network Function Descriptor | Channel PSSCH Physical Sidelink Shared Channel |
| PDCCH Physical Downlink Control Channel | PNFR Physical Network Function Record POC PTT over Cellular | PSFCH physical sidelink feedback channel |
| PDCP Packet Data Convergence Protocol | PP, PTP Point-to-Point | PSCell Primary SCell PSS Primary |
| PDN Packet Data Network, Public Data Network | PPP Point-to-Point Protocol PRACH Physical | Synchronization Signal PSTN Public Switched |
| PDSCH Physical Downlink Shared Channel | RACH PRB Physical resource block | Telephone Network PT-RS Phase-tracking reference signal |
| PDU Protocol Data Unit PEI Permanent Equipment Identifiers | PRG Physical resource block group ProSe Proximity Services, | PTT Push-to-Talk PUCCH Physical Uplink Control |
| PFD Packet Flow Description | Proximity-Based Service | Channel PUSCH Physical |
| P-GW PDN Gateway PHICH Physical hybrid-ARQ indicator channel | PRS Positioning Reference Signal PRR Packet Reception Radio | Uplink Shared Channel QAM Quadrature Amplitude Modulation |
| PHY Physical layer PLMN Public Land Mobile | PS Packet Services PSBCH Physical | QCI QoS class of identifier |
| QCL Quasi-co-location QFI QoS Flow ID, QoS Flow Identifier | group REG Resource Element Group | RNTI Radio Network Temporary Identifier ROHC RObust Header |
| QoS Quality of Service QPSK Quadrature (Quaternary_ Phase Shift Keying | Rel Release REQ REQuest RF Radio Frequency RI Rank Indicator | Compression RRC Radio Resource Control, Radio Resource Control layer |
| QZSS Quasi-Zenith Satellite RA-RNTI Random | RIV Resource indicator value RL Radio Link | RRM Radio Resource Management RS Reference Signal |
| Access RNTI RAB Radio Access Bearer, Random Access Burst | RLC Radio Link Control, Radio Link Control layer RLC AM RLC Acknowledged Mode | RSRP Reference Signal Received Power RSRQ Reference Signal Received Quality |
| RACH Random Access Channel | RLC UM RLC Unacknowledged Mode | RSSI Received Signal Strength Indicator |
| RADIUS Remote Authentication Dial In User Service | RLF Radio Link Failure RLM Radio Link Monitoring | RSU Road Side Unit RSTD Reference Signal Time difference |
| RAN Radio Access Network | RLM-RS Reference Signal for RLM | RTP Real Time Protocol RTS Ready-To-Send |
| RAND RANDom number (used for authentication) | RM Registration Management RMC Reference | RTT Round Trip Time Rx Reception, Receiving, Receiver |
| RAR Random Access Response | Measurement Channel RMSI Remaining MSI, | S1AP S1 Application Protocol |
| RAT Radio Access Technology | Remaining Minimum System Information | S1-MME S1 for the control plane |
| RAU Routing Area Update | RN Relay Node RNC Radio Network | S1-U S1 for the user plane S-CSCF serving |
| RB Resource block Radio Bearer | Controller RNL Radio Network | CSCF S-GW Serving Gateway |
| RBG Resource block Network Temporary Identity | Layer Protocol SDAP Service Data | S-RNTI SRNC Radio SI System Information SI-RNTI System |

-continued

S-TMSI SAE Temporary Mobile Station Identifier
SA Standalone operation mode
SAE System Architecture Evolution
SAP Service Access Point
SAPD Service Access Point Descriptor
SAPI Service Access Point Identifier
SCC Secondary Component Carrier, Secondary CC
SCell Secondary Cell
SCEF Service Capability Exposure Function
SC-FDMA Single Carrier Frequency Division Multiple Access
SCG Secondary Cell Group
SCM Security Context Management
SCS Subcarrier Spacing
SCTP Stream Control Transmission
SQN Sequence number
SR Scheduling Request
SRB Signalling Radio Bearer
SRS Sounding Reference Signal
SS Synchronization Signal
SSB Synchronization Signal Block
SSID Service Set Identifier
SS/PBCH Block
SSBRI SS/PBCH Block Resource Indicator, Synchronization Signal Block Resource Indicator
SSC Session and Service Continuity
SS-RSRP Synchronization Signal based Reference Signal Received Power
SS-RSRQ Synchronization Signal based Reference Signal Received Quality
SS-SINR Synchronization Signal based Signal to
U-RNTI UTRAN Radio Network Temporary Identity
UART Universal Asynchronous Receiver and Transmitter
UCI Uplink Control Information
UE User Equipment
UDM Unified Data Management
UDP User Datagram Protocol
UDSF Unstructured Data Adaptation Protocol, Service Data Adaptation Protocol layer
SDL Supplementary Downlink
SDNF Structured Data Storage Network Function
SDP Session Description Protocol
SDSF Structured Data Storage Function
SDT Small Data Transmission
SDU Service Data Unit
SEAF Security Anchor Function
SeNB secondary eNB
SEPP Security Edge Protection Proxy
SFI Slot format indication
SFTD Space-Frequency Time Diversity, SFN and frame timing difference
SFN System Frame Number
SgNB Secondary gNB
SGSN Serving GPRS Support Node
S-GW Serving Gateway
Noise and Interference Ratio
SSS Secondary Synchronization Signal
SSSG Search Space Set Group
SSSIF Search Space Set Indicator
SST Slice/Service Types
SU-MIMO Single User MIMO
SUL Supplementary Uplink
TA Timing Advance, Tracking Area
TAC Tracking Area Code
TAG Timing Advance Group
TAI Tracking Area Identity
TAU Tracking Area Update
TB Transport Block
TBS Transport Block Size
TBD To Be Defined
TCI Transmission Configuration Indicator
TCP Transmission Communication Protocol
TDD Time Division
URLLC Ultra-Reliable and Low Latency
USB Universal Serial Bus
USIM Universal Subscriber Identity Module
USS UE-specific search space
UTRA UMTS Terrestrial Radio Access
UTRAN Universal Terrestrial Radio Access Network
UwPTS Uplink Pilot Time Slot Information RNTI
SIB System Information Block
SIM Subscriber Identity Module
SIP Session Initiated Protocol
SiP System in Package
SL Sidelink
SLA Service Level Agreement
SM Session Management
SMF Session Management Function
SMS Short Message Service
SMSF SMS Function
SMTC SSB-based Measurement Timing Configuration
SN Secondary Node, Sequence Number
SoC System on Chip
SON Self-Organizing Network
SpCell Special Cell
SP-CSI-RNTISemi-Persistent CSI RNTI
SPS Semi-Persistent Scheduling
Duplex
TDM Time Division Multiplexing
TDMA Time Division Multiple Access
TE Terminal Equipment
TEID Tunnel End Point Identifier
TFT Traffic Flow Template
TMSI Temporary Mobile Subscriber Identity
TNL Transport Network Layer
TPC Transmit Power Control
TPMI Transmitted Precoding Matrix Indicator
TR Technical Report
TRP, TRxP Transmission Reception Point
TRS Tracking Reference Signal
TRx Transceiver
TS Technical Specifications, Technical Standard
TTI Transmission Time Interval
Tx Transmission, Transmitting, Transmitter
VNFFGD VNF Forwarding Graph Descriptor
VNFM VNF Manager
VOIP Voice-over-IP, Voice-over- Internet Protocol
VPLMN Visited Public Land Mobile Network
VPN Virtual Private Network
VRB Virtual Resource Block
WiMAX Worldwide -continued

| Storage Network Function | V2I Vehicle-to-Infrastruction | Interoperability for Microwave Access |
| UICC Universal Integrated Circuit Card | V2P Vehicle-to-Pedestrian | WLANWireless Local Area Network |
| UL Uplink | V2V Vehicle-to-Vehicle | WMAN Wireless |
| UM Unacknowledged Mode | V2X Vehicle-to-everything | Metropolitan Area Network |
| UML Unified Modelling Language | VIM Virtualized Infrastructure Manager | WPAN Wireless Personal Area Network |
| UMTS Universal Mobile Telecommunications System | VL Virtual Link, VLAN Virtual LAN, Virtual Local Area Network | X2-C X2-Control plane X2-U X2-User plane XML extensible Markup Language |
| UP User Plane | | |
| UPF User Plane Function | VM Virtual Machine | XRES Expected user |
| URI Uniform Resource Identifier | VNF Virtualized Network Function | RESponse XOR exclusive OR |
| URL Uniform Resource Locator | VNFFG VNF Forwarding Graph | ZC Zadoff-Chu ZP Zero Power |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The term "application" may refer to a complete and deployable package, environment to achieve a certain function in an operational environment. The term "AI/ML application" or the like may be an application that contains some AI/ML models and application-level descriptions.

The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure.

The term "machine learning model," "ML model," or the like may also refer to ML methods and concepts used by an ML-assisted solution. An "ML-assisted solution" is a solution that addresses a specific use case using ML algorithms during operation. ML models include supervised learning (e.g., linear regression, k-nearest neighbor (KNN), descision tree algorithms, support machine vectors, Bayesian algorithm, ensemble algorithms, etc.) unsupervised learning (e.g., K-means clustering, principle component analysis (PCA), etc.), reinforcement learning (e.g., Q-learning, multi-armed bandit learning, deep RL, etc.), neural networks, and the like. Depending on the implementation a specific ML model could have many sub-models as components and the ML model may train all sub-models together. Separately trained ML models can also be chained together in an ML pipeline during inference. An "ML pipeline" is a set of functionalities, functions, or functional entities specific for an ML-assisted solution; an ML pipeline may include one or several data sources in a data pipeline, a model training pipeline, a model evaluation pipeline, and an actor. The "actor" is an entity that hosts an ML assisted solution using the output of the ML model inference). The term "ML training host" refers to an entity, such as a network function, that hosts the training of the model. The term "ML inference host" refers to an entity, such as a network function, that hosts model during inference mode (which includes both the model execution as well as any online learning if applicable). The ML-host informs the actor about the output of the ML algorithm, and the actor takes a decision for an action (an "action" is performed by an actor as a result of the output of an ML assisted solution). The term "model inference information" refers to information used as an input to the ML model for determining inference(s); the data used to train an ML model and the data used to determine inferences may overlap, however, "training data" and "inference data" refer to different concepts.

The invention claimed is:

1. An electronic device comprising:

one or more processors; and one or more non-transitory computer-readable media comprising instructions that, upon execution of the instructions by the one or more processors, are to cause a non real-time (Non-RT) radio access network (RAN) intelligent controller (RIC) to:

identify physical positioning information related to a user equipment (UE), the physical positioning information including location information of the UE that is based on a geographical area description (GAD) shape;

generate enrichment information (EI) related to the physical positioning information; and transmit the EI over an A1 interface to a near real-time (Near-RT) RIC.

2. The electronic device of claim 1, wherein the GAD shape is related to an ellipsoid point, a polygon, or an ellipsoid arc.

3. The electronic device of claim 1, wherein the physical positioning information further includes velocity information of the UE.

4. The electronic device of claim 3, wherein the velocity information includes at least one of horizontal velocity information, vertical velocity information, or uncertainty information.

5. The electronic device of claim 3, wherein:

generation of the EI includes generation of a first EI related to the location information and a second EI related to the velocity information, wherein the first EI has a same type as the second EI.

6. The electronic device of claim 3, wherein:

generation of the EI includes generation of a first EI related to the location information and a second EI related to the velocity information, and the first EI has a different type than a type of the second EI.

7. The electronic device of claim 1, wherein the instructions are further to cause the Non-RT RIC to:

transmit, to the Near-RT RIC, an indication of an EI type definition that is related to what physical positioning information the Non-RT RIC is configured to provide to the Near-RT RIC.

8. The electronic device of claim 7, wherein the EI type definition indicates at least one of:

whether the Non-RT RIC is configured to provide velocity information;

what types of location information the Non-RT RIC is configured to provide; or what types of velocity information the Non-RT RIC is configured provide.

9. The electronic device of claim 7, wherein the instructions are further to cause the Non-RT RIC to:

identify, from the Near-RT RIC, a request for an EI, wherein the request is based on the EI type definition; and generate the EI based on the request.

10. The electronic device of claim 1, wherein the EI includes an indication of a UE identifier of the UE.

11. The electronic device of claim 1, wherein the EI includes an indication of a time stamp related to the physical positioning information.

12. The electronic device of claim 1, wherein the EI includes physical positioning information for a group of UEs at a single time instance.

13. The electronic device of claim 1, wherein the EI includes physical positioning information for a single UE at a multiple time instances.

14. The electronic device of claim 1, wherein the EI includes acceleration information, turning information, or altitude change information related to the UE.

15. The electronic device of claim 1, wherein the EI includes an indication of a measurement periodicity or frequency associated with the physical positioning information.

16. One or more non-transitory computer-readable media (NTCRM) comprising instructions that, upon execution of the instructions by one or more processors, are to cause a near real-time (Near-RT) radio access network (RAN) intelligent controller (RIC) to:

identify enhancement information (EI) received over an A1 interface from a non real-time (Non-RT) RIC;

identify, based on the EI, physical positioning information related to a user equipment (UE); and identify, from the Non-RT RIC, an indication of an EI type definition that is related to what physical positioning information the Non-RT RIC is configured to provide to the Near-RT RIC, wherein the EI type definition indicates at least one of:

whether the Non-RT RIC is configured to provide velocity information, what types of location information the Non-RT RIC is configured to provide, or what types of velocity information the Non-RT RIC is configured provide.

17. The one or more NTCRM of claim 16, wherein the physical positioning information is location information of the UE.

18. The one or more NTCRM of claim 16, wherein the physical positioning information includes velocity information of the UE.

19. The one or more NTCRM of claim 16, wherein the instructions are further to cause the Near-RT RIC to transmit, to the Non-RT RIC, a request for the EI, wherein the request is based on an EI type definition, wherein the EI is generated based on the request.

20. The one or more NTCRM of claim 16, wherein the EI includes at least one of an indication of a UE identifier of the UE or an indication of a time stamp related to the physical positioning information.

* * * * *